(12) United States Patent
Nakamura et al.

(10) Patent No.: US 9,407,802 B2
(45) Date of Patent: Aug. 2, 2016

(54) IMAGING APPARATUS

(71) Applicants: NIDEC COPAL CORPORATION, Itabashi-ku, Tokyo-to (JP); NIDEC ELESYS CORPORATION, Kawasaki-shi, Kanagawa (JP)

(72) Inventors: Yuta Nakamura, Itabashi-ku (JP); Yohei Nagai, Itabashi-ku (JP); Yushi Takehara, Kawasaki (JP); Naoya Takeda, Kawasaki (JP)

(73) Assignees: NIDEC COPAL CORPORATION, Tokyo (JP); NIDEC ELESYS CORPORATION, Kanagawa (JP)

( * ) Notice: Subject to any disclaimer, the term of this patent is extended or adjusted under 35 U.S.C. 154(b) by 0 days.

(21) Appl. No.: 14/749,999

(22) Filed: Jun. 25, 2015

(65) Prior Publication Data
US 2016/0028929 A1    Jan. 28, 2016

(30) Foreign Application Priority Data

Jul. 4, 2014 (JP) ................................. 2014-139152
Nov. 28, 2014 (JP) ................................. 2014-241225

(51) Int. Cl.
H04N 5/225 (2006.01)

(52) U.S. Cl.
CPC .......... *H04N 5/2254* (2013.01); *H04N 5/2253* (2013.01)

(58) Field of Classification Search
CPC .......................... H04N 5/2254; H04N 5/2253
USPC ........................................ 348/340, 373–375
See application file for complete search history.

(56) References Cited

U.S. PATENT DOCUMENTS

| 6,693,674 | B1* | 2/2004 | Wataya ............... | H04N 5/2253 348/373 |
| 8,542,451 | B2 | 9/2013 | Lu et al. | |
| 2007/0263116 | A1* | 11/2007 | Sakurai ............... | H01L 31/0203 348/340 |
| 2009/0244361 | A1 | 10/2009 | Gebauer et al. | |
| 2011/0007200 | A1* | 1/2011 | Okuie ............... | H01L 27/14618 348/335 |
| 2014/0002676 | A1* | 1/2014 | Ning ....................... | G02B 7/14 348/187 |
| 2014/0009619 | A1 | 1/2014 | Koppe | |
| 2014/0022657 | A1 | 1/2014 | Lu et al. | |

(Continued)

FOREIGN PATENT DOCUMENTS

| JP | 2008-71378 A | 3/2008 |
| JP | 2012-074934 A | 4/2012 |
| JP | 2014-186212 A | 10/2014 |

*Primary Examiner* — Sinh Tran
*Assistant Examiner* — Zhenzhen Wu
(74) *Attorney, Agent, or Firm* — Keating & Bennett

(57) ABSTRACT

An imaging apparatus includes an image-forming optical system assembly, an image sensor, a sensor retaining portion that retains the image sensor, a coupling portion that is fixed to the image-forming optical system assembly, and a movement suppressing member that is immovable with respect to the coupling portion. The image-forming optical system assembly includes an optical system-side adhesive surface, the coupling portion includes an opposite surface, and the sensor retaining portion includes a sensor-side adhesive surface. A first adhesive is filled in at least a portion of a gap between the optical system-side adhesive surface and the sensor-side adhesive surface, and comes into contact with both of the optical system-side adhesive surface and the sensor-side adhesive surface. The movement suppressing member contacts the opposite surface, and contacts the sensor retaining portion on a surface facing the rear side out of surfaces of the sensor retaining portion.

33 Claims, 11 Drawing Sheets

(56) References Cited

U.S. PATENT DOCUMENTS

| | | |
|---|---|---|
| 2014/0036084 A1 | 2/2014 | Lu |
| 2014/0211009 A1 | 7/2014 | Fürsich |
| 2015/0022718 A1* | 1/2015 | Kano .................. H04N 5/2254 348/373 |

* cited by examiner

IMAGING APPARATUS

BACKGROUND OF THE INVENTION

1. Field of the Invention

The present invention relates to an imaging apparatus.

2. Description of the Related Art

Conventionally, there are widely known imaging apparatuses which image a subject image formed with an imaging lens using an image sensor such as a CCD image sensor or a CMOS image sensor.

For example, an imaging apparatus disclosed in Japanese Patent Laid-Open No. 2012-74934 includes an imaging lens, an image sensor, a lens holder retaining the imaging lens, a front casing to which the lens holder is fixed, and a circuit board onto which the image sensor is implemented and fixed. The imaging apparatus has a structure in which the image sensor is fixed relative to the imaging lens by screw fastening of the circuit board on the rear surface of the front casing.

In such an imaging apparatus, the circuit board is fastened with screws in the assembly process. Hence, there is a concern that position displacement of the image sensor relative to the imaging lens occurs due to influence of the circuit board co-rotating under rotation of the screws, the circuit board subducting caused by over-fastening of the screws, or a similar situation.

In order to prevent such problems, a technique of adhesively fixing the image sensor to the member retaining the imaging lens has been attempted. However, when such an imaging apparatus is subject to large temperature change, its image-forming characteristics deteriorate, which is another problem. An on-vehicle imaging apparatus or the like is presented as an example of usage in which the apparatus is subjected to large temperature change.

SUMMARY OF THE INVENTION

Preferred embodiments of the present invention have been devised in view of the above-mentioned circumstances in the conventional art, and provide an imaging apparatus capable of preventing positional displacement of the circuit board in fixing the same from occurring and suppressing deterioration in image-forming characteristics caused by temperature change.

It has been discovered that the deterioration in image-forming characteristics is caused by thermal expansion/thermal contraction of adhesive which is used to fix the image sensor under the temperature change. The thermal expansion changes the position of the image sensor which is displaced from the original preferable position, causing the deterioration in image-forming characteristics. Since adhesive is typically applied to be thin, positional displacement due to thermal expansion is negligible. Regarding the preferred embodiments of the present invention, however, since the adhesive fixes the image sensor and the imaging lens to each other while a gap for relative position adjustment is secured therebetween, the thickness of the adhesive has to be thicker than in the typical case. Due to this, the thermal expansion of the adhesive has unexpected influences.

Therefore, in order to solve the problem, there is provided an imaging apparatus according to a preferred embodiment of the present invention including an image-forming optical system assembly; an image sensor that is disposed on a rear side which is a side on which rays incident on the image-forming optical system assembly form an image relative to the image-forming optical system assembly, and that an image generated by the image-forming optical system assembly is projected on; a sensor retaining portion that retains the image sensor; a coupling portion that is fixed to the image-forming optical system assembly; and a movement suppressing member that is immovable with respect to the coupling portion. The image-forming optical system assembly includes an optical system-side adhesive surface that spreads at a position spaced apart from an optical axis in a direction intersecting a direction in which the optical axis extends. The coupling portion includes an opposite surface that spreads at a position spaced apart from the optical axis in a direction intersecting the direction in which the optical axis extends. The sensor retaining portion includes a sensor-side adhesive surface that spreads at a position spaced apart from the optical axis in a direction intersecting the direction in which the optical axis extends. The optical system-side adhesive surface faces the rear side, the sensor-side adhesive surface faces a front side reverse to the rear side, the opposite surface faces the front side in an optical axis direction, a first adhesive that at least a portion of a gap between the optical system-side adhesive surface and the sensor-side adhesive surface is filled with, and that comes into close contact with both of the optical system-side adhesive surface and the sensor-side adhesive surface is included. The movement suppressing member comes into contact with the opposite surface, and comes into contact with the sensor retaining portion on a surface facing the rear side out of surfaces of the sensor retaining portion.

In the above-mentioned imaging apparatus, a surface of the sensor retaining portion may be in a non-contacting state with a surface of the image-forming optical system assembly.

In the above-mentioned imaging apparatus, a region in which the movement suppressing member comes into contact with the sensor retaining portion may at least partially overlap with a region in which the first adhesive comes into contact with the sensor-side adhesive surface as seen in the optical axis direction.

In the above-mentioned imaging apparatus, regions in which the first adhesive comes into contact with the sensor-side adhesive surface may be present on both sides of the optical axis, regions in which the movement suppressing member comes into contact with the sensor retaining portion may be present on both sides of the optical axis, and the region in which the movement suppressing member comes into contact with the sensor retaining portion may be closer to the optical axis than the region in which the first adhesive comes into contact with the sensor-side adhesive surface.

In the above-mentioned imaging apparatus, the sensor retaining portion includes a through hole penetrating therethrough in the optical axis direction, and the coupling portion includes a shaft portion whose diameter is smaller than an inner diameter of the through hole and a head portion larger in maximum width than the through hole. The shaft portion is inserted through the through hole, and the head portion is positioned more on the rear side than the through hole. The opposite surface may be positioned at the head portion.

In the above-mentioned imaging apparatus, the coupling portion or the image-forming optical system assembly includes a pair of side walls that interpose the sensor retaining portion therebetween and extend on the rear side. Tips of the pair of side walls reach the rear side more than at least a portion of the surface, of the sensor retaining portion, facing the rear side. The coupling portion may include an extending portion extending from the tip of the side wall toward the optical axis, and the opposite surface may be positioned on a surface of the extending portion.

In the above-mentioned imaging apparatus, the sensor retaining portion includes a circuit board. The movement suppressing member may come into contact with the sensor retaining portion on a surface of the circuit board.

In the above-mentioned imaging apparatus, the image-forming optical system assembly includes an image-forming optical system and an image-forming optical system retaining member that retains the image-forming optical system. The optical system-side adhesive surface may be positioned on a surface of the image-forming optical system retaining member.

In the above-mentioned imaging apparatus, the coupling portion may be a portion of the image-forming optical system retaining member.

In the above-mentioned imaging apparatus, the movement suppressing member may be a metal member.

In the above-mentioned imaging apparatus, the movement suppressing member may be a resin member.

In the above-mentioned imaging apparatus, a ratio of a volume of the first adhesive relative to a volume of the resin member may be about 0.5 or more and about 2 or less, for example.

According to a preferable preferred embodiment of the present invention, an imaging apparatus capable of preventing positional displacement of the image sensor in fixing the same and reducing deterioration in image-forming characteristics under temperature change is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
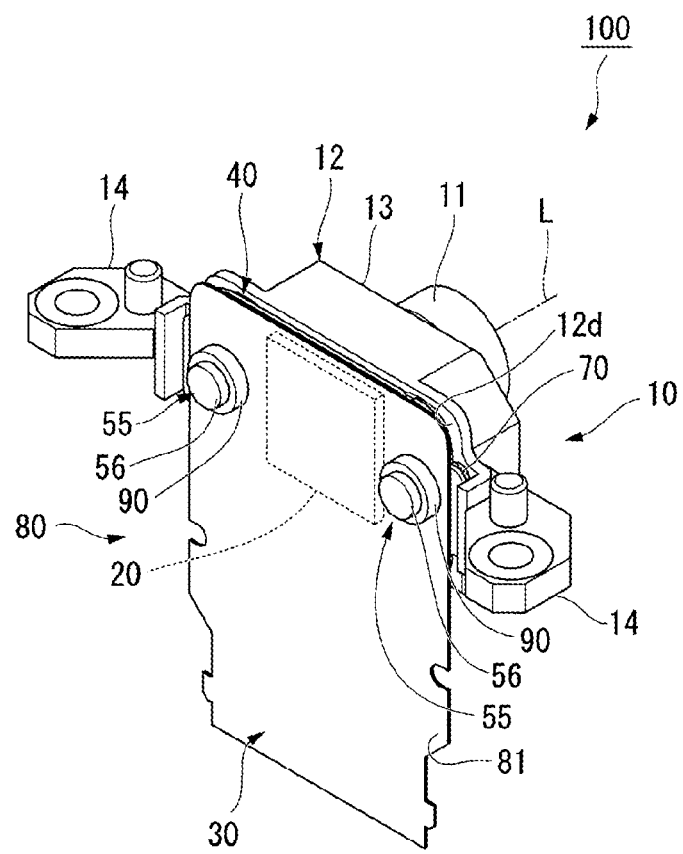
FIG. 1 is a perspective view, as seen from a rear oblique side, illustrating an imaging apparatus according to a first preferred embodiment of the present invention.
Figure 1:
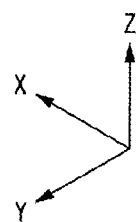

Hereafter, preferred embodiments of the present invention are described with reference to the drawings. Notably, an X-Y-Z coordinate system is presented in the drawings. In the description below, each direction is explained based on the coordinate system as needed. Notably, the X-Y-Z coordinate system does not indicate positional relation or directions under implementation in an actual device or the like.

FIG. 1 is a perspective view of an imaging apparatus 100 according to a first preferred embodiment of the present invention.

The imaging apparatus 100 preferably includes an image-forming optical system assembly 10 including an optical axis L, an image sensor 20, a sensor retaining portion 80 retaining the image sensor 20, coupling portions 55, a first adhesive 70 fixing the image-forming optical system assembly 10 and the sensor retaining portion 80 to each other, and cylindrical movement suppressing members 90. Two coupling portions 55 are present and each of them is a portion of one member defining the image-forming optical system assembly 10.

Notably, in the description below, the optical axis L of the image-forming optical system assembly 10 is parallel or substantially parallel to the Y-axis in each drawing. Moreover, the +Y-direction is a direction toward a rear side and the −Y-direction is a direction toward a front side. The image sensor is disposed on the rear side relative to the image-forming optical system assembly 10.

Figure 2:
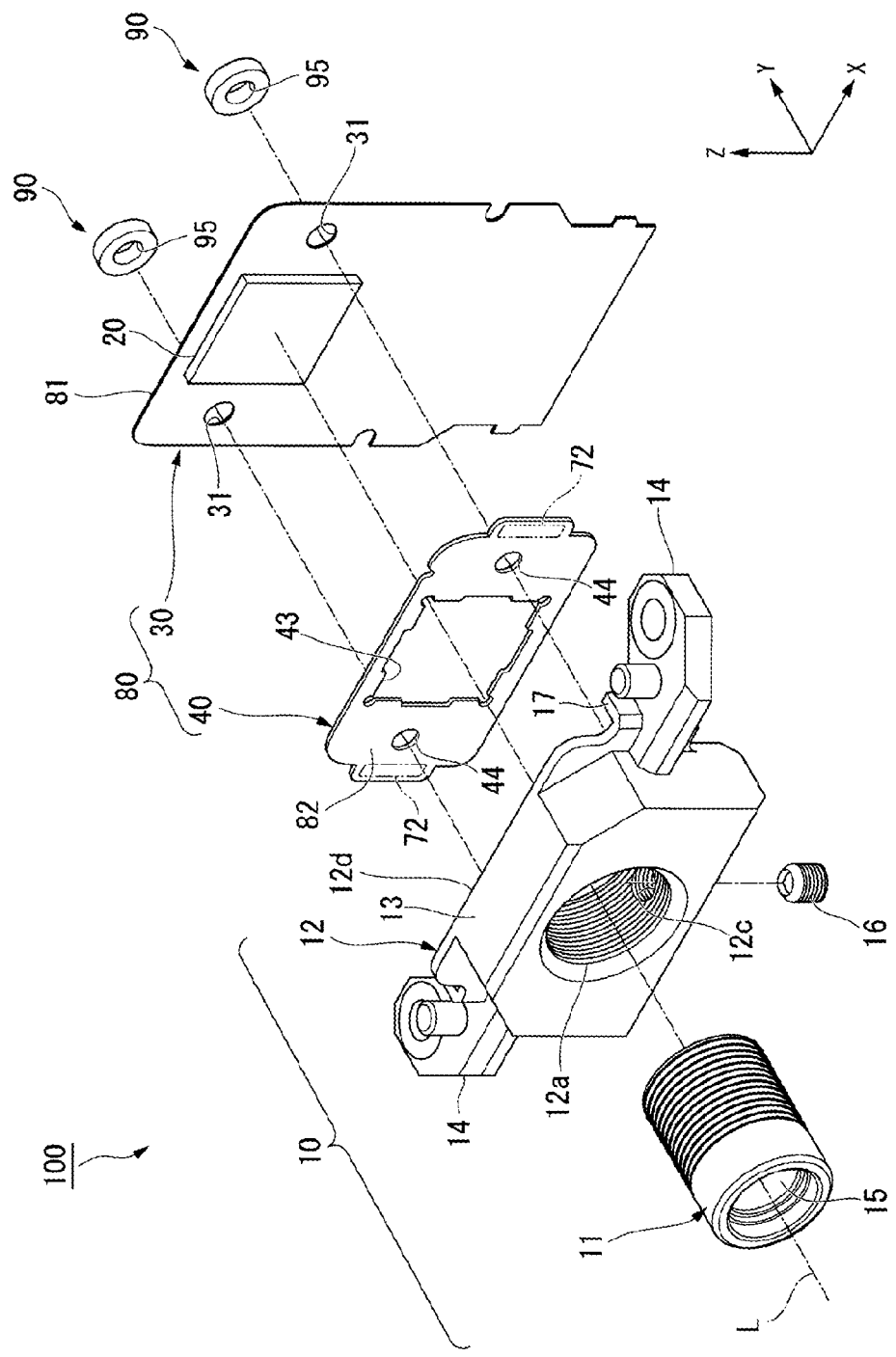
FIG. 2 is an exploded perspective view as seen from a front oblique side of the imaging apparatus according to the first preferred embodiment of the present invention.
Figure 3:
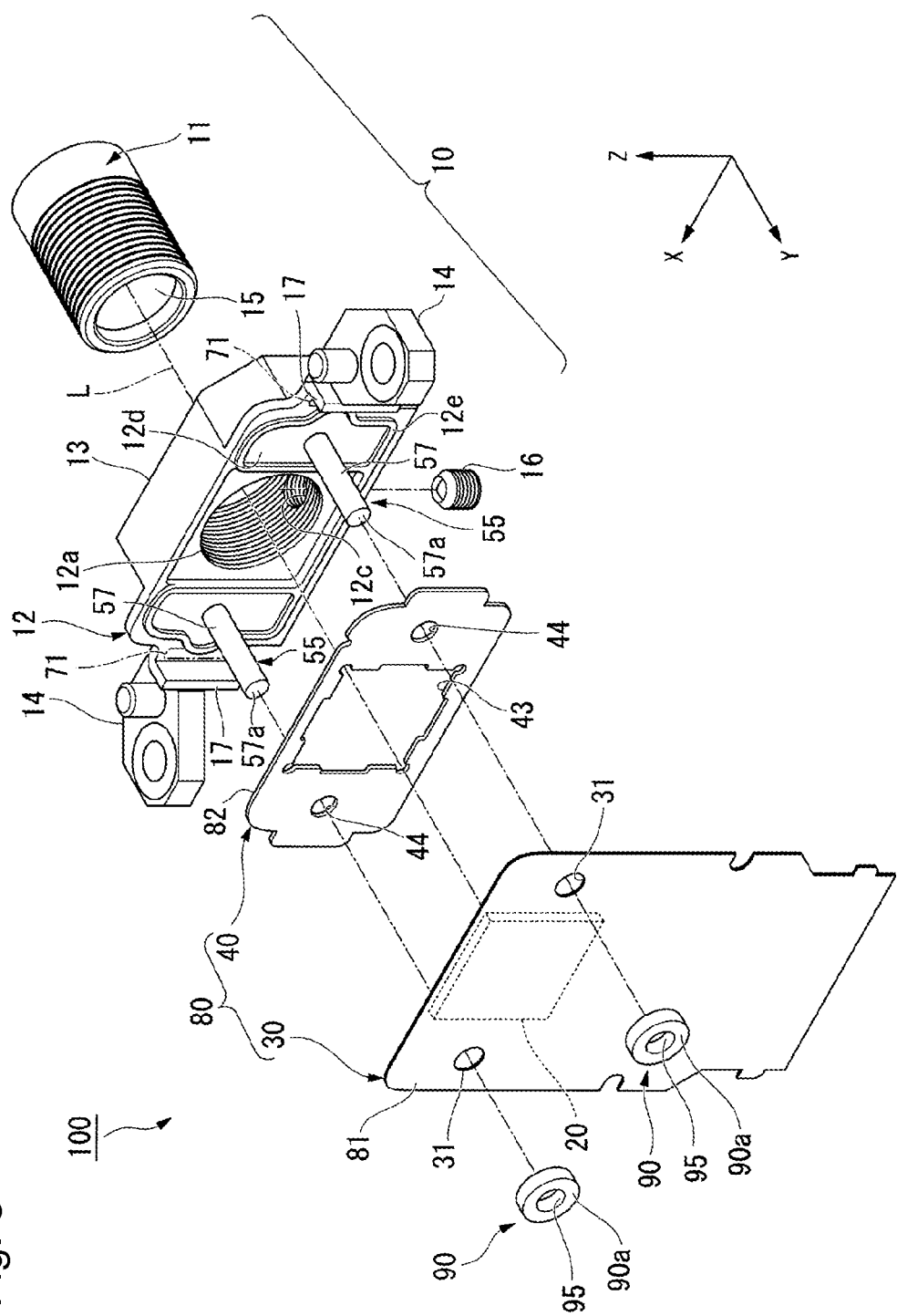
FIG. 3 is an exploded perspective view as seen from the rear oblique side of the imaging apparatus according to the first preferred embodiment of the present invention.

FIG. 2 and FIG. 3 are exploded perspective views of the imaging apparatus 100. FIG. 2 and FIG. 3 are presented with the first adhesive 70 omitted. Moreover, as to the coupling portions 55, after shaft portions 57 are inserted through the movement suppressing members 90, tips 57a of the shaft portions 57 are preferably deformed to become thick to be head portions 56. Accordingly, in FIG. 3, which is an exploded view, the head portions 56 of the coupling portions 55 are not deformed.

The imaging apparatus 100 includes the image-forming optical system assembly 10. The image-forming optical system assembly 10 preferably includes an image-forming optical system 15 including the optical axis L, a lens barrel 11 fixing the image-forming optical system 15, a lens retaining member 12 retaining the lens barrel 11, and a stopping screw 16 configured to fix the lens barrel 11 to the lens retaining member 12.

The image-forming optical system 15 has a configuration in which plural lenses are combined with their optical axes allowed to coincide with one another. As the combined lenses, for example, glass-made lenses or resin lenses are preferably used.

The lens barrel 11 preferably has a cylindrical or substantially cylindrical shape. The image-forming optical system 15 is contained inside the lens barrel 11. The optical axis of the image-forming optical system 15 (that is, the optical axis L of the image-forming optical system assembly 10) coincides with the axis of the lens barrel 11.

The lens retaining member 12 is made, for example, of aluminum alloy and the like and includes a main body portion 13 which is a substantially rectangular block, a pair of flange portions 14, and a pair of guide portions 17.

In the main body portion 13, a fitting hole 12a which has the optical axis L as its center axis is provided. The lens barrel 11 is retained on the inner circumferential surface of the fitting hole 12a.

Moreover, a screw hole 12c is preferably provided in the main body portion 13. The screw hole 12c penetrates it from the outer side face of the main body portion 13 to the inner side surface of the fitting hole 12a in a direction perpendicular or substantially perpendicular to the optical axis L (in the −Z-direction in the present preferred embodiment). A stopping screw 16 is preferably attached into the screw hole 12c.

The lens barrel 11 is fitted into the fitting hole 12a of the main body portion 13 from the front side. After that, the stopping screw 16 is furthermore fitted into the screw hole 12c. By doing so, the outer circumference of the lens barrel 11 is fastened with the stopping screw 16. As a result, the lens barrel 11 is fixed to the main body portion 13.

As illustrated in FIG. 3, the main body portion 13 includes a rear side surface (optical system-side adhesive surface) 12d on the rear side (that is, on the +Y-direction side). The rear side surface 12d spreads out at a position spaced apart from the optical axis L in a direction intersecting the direction in which the optical axis L extends. In the preferred embodiment, the rear side surface 12d is preferably rectangular. The rear side surface 12d is a surface opposite to the sensor retaining portion 80. First adhesive regions 71 are provided on the rear side surface 12d. First adhesives 70 comes into close contact with the first adhesive regions 71. The first adhesive 70 fix the lens retaining member 12 and the sensor retaining portion 80 to each other.

In the present preferred embodiment, the rear side surface 12d is a plane perpendicular or substantially perpendicular to the optical axis L. Nevertheless, the rear side surface 12d is sufficient to be a surface which spreads in a direction perpendicular or substantially perpendicular to the optical axis L, and may be, for example, a plane which is inclined relative to the plane perpendicular or substantially perpendicular to the optical axis L, or a curved surface.

In the center of the rear side surface 12d, an opening part of the fitting hole 12a is disposed. Moreover, on the rear side surface 12d, the pair of coupling portions 55 extending toward the rear side are provided. On the rear side surface 12d, the coupling portions 55 are disposed on both sides of the fitting hole 12a as the center in the X-direction, respectively. Each of the coupling portions 55 has a center axis parallel or substantially parallel to the optical axis L.

Moreover, the rear side surface 12d preferably includes ribs 12e. Each of the ribs 12e has a strip shape and protrudes from the rear side surface 12d on the rear side (on the +Y-direction side).

Each of the pair of guide portions 17 of the lens retaining member 12 protrudes from the rear side surface 12d of the main body portion 13 on the rear side (in the +Y-direction). The pair of guide portions 17 are disposed on two opposite sides of the rectangular or substantially rectangular rear side surface 12d, respectively.

The image sensor 20 preferably is a CMOS image sensor and images a subject image formed thereon through the image-forming optical system 15. Moreover, in the present preferred embodiment, the image sensor 20 is rectangular or substantially rectangular. Notably, as the image sensor, any other kind of solid-state image sensor such as a CCD image sensor may be used.

The image sensor 20 is disposed on the rear side (in the +Y-direction) which is a side on which rays incident on the image-forming optical system assembly 10 form an image, and an image generated by the image-forming optical system assembly 10 is projected on the image sensor 20.

As illustrated in FIG. 2 and FIG. 3, the sensor retaining portion 80 preferably includes a flexible printed circuit board (circuit board) 30 on which the image sensor 20 is implemented, and a fixing plate 40 retaining the image sensor 20 from its outer circumferential side. The sensor retaining portion 80 retains the image sensor 20.

In the imaging apparatus 100, the sensor retaining portion 80 is fixed to the image-forming optical system assembly with the first adhesives 70. The surface of the sensor retaining portion 80 is in a non-contacting state with the surface of the image-forming optical system assembly 10.

The image sensor 20 is implemented on and fixed to the flexible printed circuit board 30. Wires (not shown) and the like used to implement the image sensor 20 are preferably printed on the flexible printed circuit board 30. The flexible printed circuit board 30 includes a pair of through holes 31 which penetrate it in the direction of the optical axis L. The inner diameter of the through hole 31 is larger than the outer diameter of the shaft portion 57 of the coupling portion 55. The shaft portions 57 are inserted through the through holes 31, respectively, and do not come into contact with the inner surfaces of the through holes 31.

The fixing plate 40 is preferably, for example, a metal flat plate and retains the image sensor 20.

A retaining hole 43 is provided in the center of the fixing plate 40, and a pair of through holes 44 which penetrate it in the direction of the optical axis L are provided on both sides of the retaining hole 43 in the X-direction. The shape of the retaining hole 43 is a rectangular shape similar to the outline of the image sensor 20 in its plan view. The rectangular shape here is not limited to a strict rectangular shape, as mentioned later, but also includes, for example, a rectangular shape whose corners are rounded and similar shapes. The inner diameter of the through hole 44 is larger than the outer diameter of the shaft portion 57 of the coupling portion 55. The shaft portions 57 are inserted through the through holes 44 and do not come into contact with them.

Figure 4:
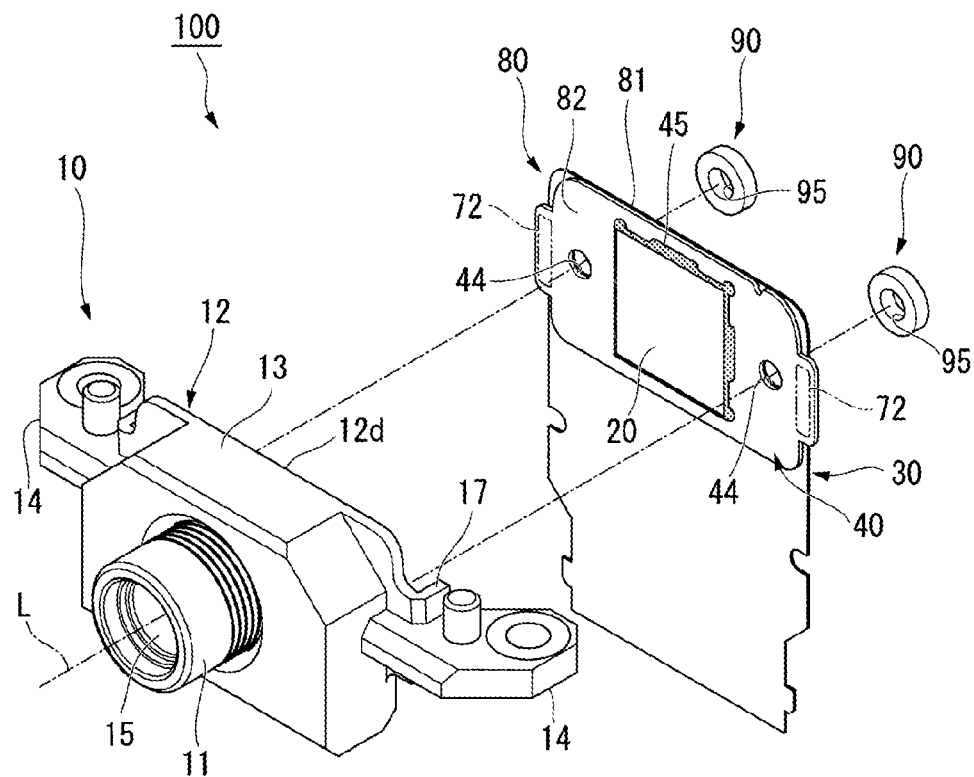
FIG. 4 is an exploded perspective view, as seen from the front oblique side, of the imaging apparatus according to the first preferred embodiment of the present invention which is divided into a portion defining an image-forming optical system assembly 10, a portion defining a sensor retaining portion and an image sensor, and movement suppressing members.
Figure 4:
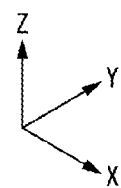

FIG. 4 is an exploded view in which the imaging apparatus 100 is divided into a portion defining the image-forming optical system assembly 10, a portion defining the sensor retaining portion 80 and the image sensor 20, and the movement suppressing members 90. FIG. 4 is presented with the first adhesives 70 omitted.

As illustrated in FIG. 4, in the sensor retaining portion 80, the image sensor 20 is inserted into the retaining hole 43. An adhesive 45 is disposed in a region between the outer edge portion of the image sensor 20 and the inner edge portion of the retaining hole 43. The adhesive 45 fixes the image sensor 20 to the fixing plate 40. In other words, the fixing plate 40 retains the image sensor 20 via the adhesive 45. Notably, the adhesive 45 may be disposed between the fixing plate 40 and the flexible printed circuit board 30. In this case, the fixing plate 40 and the flexible printed circuit board 30 are caused to adhere to each other.

The sensor retaining portion 80 preferably includes the fixing plate 40 and the flexible printed circuit board 30. The sensor retaining portion 80 includes a first surface 81 and a second surface (sensor-side adhesive surface) 82. The first surface 81 is positioned on the rear side (that is, +Y-side) of the fixing plate 40 and faces the rear side. Moreover, the second surface 82 is positioned on the front side (that is, −Y-side) of the flexible printed circuit board 30 and faces the front side to oppose the lens retaining member 12. As illustrated in FIG. 4, the second surface 82 preferably includes second adhesive regions 72. In the second adhesive regions 72, the first adhesives 70 are disposed. The first adhesives 70 fix the sensor retaining portion 80 and the image-forming optical system assembly 10 to each other.

The first surface 81 and the second surface 82 spread out at positions apart from the optical axis L in directions intersecting the direction in which the optical axis L extends. In the present preferred embodiment, the first surface 81 and the second surface 82 are preferably planes perpendicular or substantially perpendicular to the optical axis L. Nevertheless, the first surface 81 and the second surface 82 only have to be surfaces which spread out in directions perpendicular or substantially perpendicular to the optical axis L, and may be planes which are inclined relative to the plane perpendicular or substantially perpendicular to the optical axis L, or curved surfaces.

Figure 5:
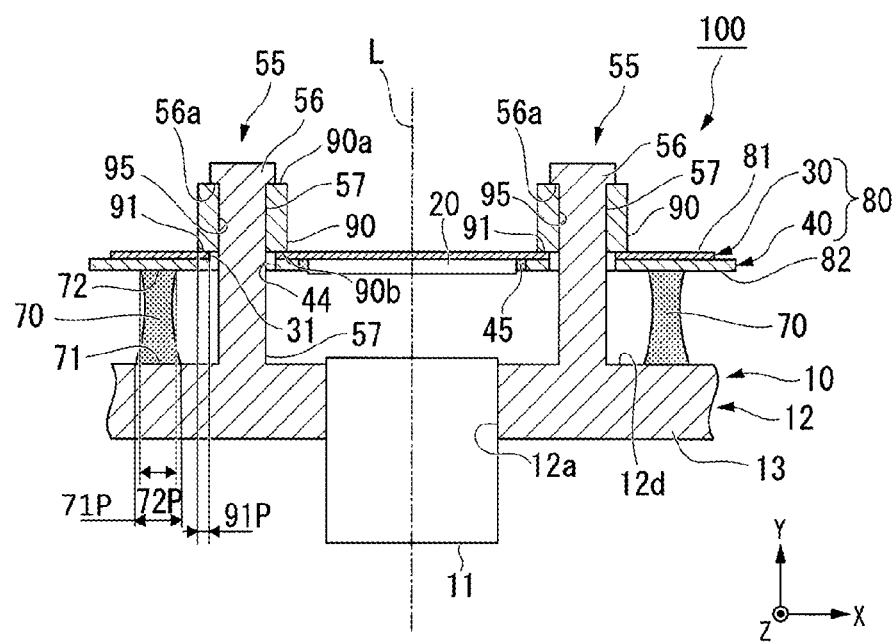
FIG. 5 is a schematic cross-sectional view, taken along an optical axis direction, of the imaging apparatus according to the first preferred embodiment of the present invention.

FIG. 5 is a schematic cross-sectional view of the imaging apparatus 100 and is a cross-section taken along the plane passing through the optical axis L and the center axes of the pair of coupling portions 55.

Notably, in FIG. 5, in order to make the characteristic portions definite, the dimensions of characteristic portions are emphasized for convenience by magnification especially in the Y-axis direction or the like. The ratios between the dimensions of the constituent portions are not always drawn to actual scale in FIG. 5.

As illustrated in FIG. 5, the pair of coupling portions 55 are preferably disposed at symmetric positions relative to the optical axis L as the center.

The coupling portion 55 preferably includes the shaft portion 57 and the head portion 56 which has an outer diameter larger than the outer diameter of the shaft portion 57.

The shaft portion 57 passes through the through holes 44 and 31. The through hole 44 of the fixing plate 40 and the through hole 31 of the flexible printed circuit board 30 are the through holes of the sensor retaining portion 80. The outer diameter of the shaft portion 57 is smaller than the inner diameters of the through holes 44 and 31.

The head portion 56 is preferably formed by deforming the tip 57a (refer to FIG. 3) of the shaft portion 57 after the shaft portion 57 is inserted through the movement suppressing member 90. The head portion 56 is positioned more on the rear side (on the +Y-direction side) than the through holes 31 and 44.

The maximum width of the head portion 56 is larger than the diameters of the through holes 44 and 31 of the sensor retaining portion 80. Moreover, in the imaging apparatus 100, the head portion 56 is positioned more on the rear side than the first surface 81 of the sensor retaining portion 80. As a result, the fixing plate 40 and the flexible printed circuit board 30 is prevented from falling off.

An opposite surface 56a which opposes the first surface 81 which is the surface on the rear side of the sensor retaining portion 80 is positioned on the front side (−Y-side) of the head portion 56. The opposite surface 56a spreads out at a position spaced apart from the optical axis L in a direction intersecting the direction in which the optical axis L extends. The opposite surface 56a faces the front side in the direction of the optical axis L.

The head portion 56 includes the opposite surface 56a which is the surface facing the front side. The opposite surface 56a comes into contact with a first end surface 90a which is an end surface of the movement suppressing member 90 on the rear side (+Y-side). Therefore, the movement suppressing member 90 is disposed between the opposite surface 56a and the first surface 81 of the sensor retaining portion 80. The pair of coupling portions 55 are preferably disposed at the symmetric positions relative to the optical axis L as the center. Therefore, the movement suppressing members 90 are also disposed at two symmetric positions relative to the optical axis L as the center.

The movement suppressing member 90 has a cylindrical shape and includes a through hole 95 at its center. The movement suppressing member 90 is immovable relative to the coupling portion. The movement suppressing member 90 is configured to suppress the sensor retaining portion 80 from moving in the direction of the optical axis L relative to the image-forming optical system assembly 10.

The movement suppressing member 90 comes into contact with the opposite surface 56a, and comes into contact with the sensor retaining portion 80 in the surface facing the rear side (first surface 81) out of the surfaces of the sensor retaining portion 80.

In the present preferred embodiment, the movement suppressing members 90 are preferably, for example, ferrite-based stainless steel-made members. Metal has a small coefficient of thermal expansion and high rigidity. Therefore, a metal material used for the movement suppressing members 90 further suppresses the movement of the sensor retaining portion 80 in the direction of the optical axis L caused by thermal expansion of the first adhesives 70. Examples of metal materials which can be used as a material of the movement suppressing members 90 include austenite-based stainless steel, copper alloy, aluminum alloy and the like but are not limited to these.

A region in which the movement suppressing member 90 comes into contact with the first surface 81 of the sensor retaining portion 80 is called a contact region 91. Moreover, a region obtained by projecting the contact region 91 in the direction of the optical axis L is called a projected contact region 91P. The projected contact region 91P is disposed at a position closer to the optical axis L than a second projected adhesive region 72P of the first adhesive 70. By doing so, the movement suppressing members 90 receives a counterforce of the pressure in the occasion of thermal expansion of the first adhesives 70 at positions close to the optical axis L.

As illustrated in FIG. 5, preferably, at least a portion of a gap between the surface on the rear side of the image-forming optical system assembly 10 (rear side surface 12d of the lens retaining member 12) and the surface on the front side of the sensor retaining portion 80 (second surface 82) is filled with the first adhesives 70. The first adhesives 70 come into close contact with both of the rear side surface 12d and the second surface 82. In the present preferred embodiment, the first adhesives 70 are disposed at two symmetric positions relative to the optical axis L as the center. The image-forming optical system assembly 10 is indirectly fixed to the sensor retaining portion 80 via the first adhesives 70.

For the first adhesives 70, for example, an adhesive of a kind which is hardened under irradiation with ultraviolet light is preferably used.

In a state where the rear side surface 12d of the lens retaining member 12 opposes the second surface 82 of the sensor retaining portion 80 at a predetermined interval, the first adhesives 70 are disposed between the rear side surface 12d and the second surface 82. After the lens retaining member 12 is disposed to oppose the sensor retaining portion 80 in a non-contacting state, the first adhesives 70 can be disposed. Moreover, the first adhesives 70 may be beforehand disposed on the rear side surface 12d of the lens retaining member 12 or on the second surface 82 of the sensor retaining portion 80.

The region in which the first adhesive 70 comes into contact with (e.g., adheres to) the rear side surface 12d of the lens retaining member 12 is called the first adhesive region 71.

Moreover, the region in which the first adhesive 70 comes into contact with (e.g., adheres to) the second surface 82 of the sensor retaining portion 80 is called the second adhesive region 72.

A first projected contact region 71P obtained by projecting the first contact region 71 in the direction of the optical axis L at least partially overlaps with a second projected contact region 72P obtained by projecting the second contact region in the direction of the optical axis L. One of unique characteristics of various preferred embodiments of the present invention is a change in relative position between the image sensor 20 and sensor retaining portion 80 and the image-forming optical system assembly 10 due to thermal expansion of the first adhesives 70 is forcibly repressed by the movement suppressing members 90. Hence, the adhesives are subject to stress in the direction of the optical axis L in the occasion of elevation of the temperature. Nevertheless, since the first adhesive region 71 and the second adhesive region 72 overlap with each other in their positions as seen in the direction of the optical axis L, even in the case of the exertion of the stress under the elevation of the temperature, the problem such as expansion of the adhesive in the optical axis L is suppressed.

Next, a preferred embodiment of an assembly procedure of the imaging apparatus 100 having the above-mentioned configuration is described.

First, as illustrated in FIG. 4, the image-forming optical system assembly 10, and the image sensor 20 and the sensor retaining portion 80 to which the image sensor 20 is fixed and which retains it are prepared, each of these components are preferably assembled in a previous procedure.

Next, the coupling portions 55 are inserted through the through holes 31 and 44 of the sensor retaining portion 80 from the rear side of the image-forming optical system assembly 10 (in the +Y-direction). Notably, in this stage, the head portions 56 of the coupling portions 55 have not yet been formed but the coupling portions 55 are defined only by the shaft portions 57 with the constant thickness from their bases to tips.

Next, the sensor retaining portion 80 is aerially retained using a predetermined apparatus in the state where it is spaced apart from the image-forming optical system assembly 10 at a predetermined interval in the non-contacting state therewith.

Next, the first adhesives 70 are disposed between the rear side surface 12d of the lens retaining member 12 and the second surface 82 of the sensor retaining portion 80.

Next, using a predetermined apparatus (not shown) to adjust the optical axis, the position of the image sensor 20 is adjusted relative to the optical axis L of the image-forming optical system assembly 10. In the position adjustment of the image sensor 20, positioning in the direction of the optical axis L, positioning in the direction perpendicular or substantially perpendicular to the optical axis L, and adjustment of inclination relative to the optical axis L are performed.

Next, the first adhesives 70 are irradiated with ultraviolet light to be hardened.

Next, the movement suppressing members 90 are attached to the coupling portions 55 to cause the second end surfaces 90b of the movement suppressing members 90 to come into contact with the first surface 81 of the sensor retaining portion 80.

Next, using a predetermined apparatus, the tips 57a on the rear side (+Y-side) of the shaft portions 57 are deformed to mold the head portions 56. The head portions 56 include the opposite surfaces 56a which come into contact with the first end surfaces 90a of the movement suppressing members 90. The molding of the head portions 56 can be performed, for example, by pressing the tips 57a of the shaft portions 57 made of resin with a heated terminal to melt them.

The procedure as above completes the assembly of the imaging apparatus 100.

In the imaging apparatus 100 according to the preferred embodiments of the present invention, the image-forming optical system assembly 10 and the sensor retaining portion 80 are preferably fixed to each other with the first adhesives 70. Accordingly, after the position adjustment of the image sensor 20 relative to the optical axis L of the image-forming optical system assembly 10 is performed, the first adhesives 70 are able to be set to fix the sensor retaining portion 80 retaining the image sensor 20 to the image-forming optical system assembly 10. By doing so, the sensor retaining portion 80 does not have to be applied with force due to fastening of screw or the like after the position adjustment of the optical axis. The displacement of the optical axis due to fixing operation is suppressed.

Moreover, in the imaging apparatus 100, the sensor retaining portion 80 is fixed to the image-forming optical system assembly 10 via the first adhesives 70 in a non-contacting state. By doing so, when the position adjustment of the image sensor 20 relative to the optical axis L of the image-forming optical system assembly 10 is performed, the sensor retaining portion 80 is able to be arbitrarily moved. More specifically, the sensor retaining portion 80 is able to be moved in the direction of the optical axis L and/or in the direction perpendicular or substantially perpendicular to the optical axis L, and/or inclined relative to the optical axis L, which facilitates the positioning. Accordingly, the positioning of the sensor retaining portion 80 is able to be arbitrarily performed to position the image sensor 20 at the most suitable position. Notably, in the specification, the state of no contact means that the sensor retaining portion does not come into direct contact with the image-forming optical system assembly. It should be noted that the state where the adhesive intervenes between the two members is also included in the non-contacting state.

Moreover, the coupling portion 55 of the imaging apparatus 100 preferably includes the shaft portion 57 and the head portion 56. The outer diameter of the shaft portion 57 is smaller than the inner diameters of the through holes 31 and 44 of the sensor retaining portion 80 and the shaft portion 57 is inserted through the through holes 31 and 44. The head portion 56 is positioned on the rear side of the sensor retaining portion 80 and its maximum width is larger than the inner diameters of the through holes 31 and 44. Therefore, even if the first adhesives 70 are peeled off between the image-forming optical system assembly 10 and the sensor retaining portion 80 due to application of impact or the like on the imaging apparatus 100 from the outside, the head portions 56 work as retainers to prevent the sensor retaining portion 80 from falling off.

Moreover, the movement suppressing members 90 of the imaging apparatus 100 are preferably disposed between the opposite surfaces 56a of the head portions 56 of the coupling portions 55 and the first surface 81 of the sensor retaining portion 80.

When the temperature of the imaging apparatus 100 goes up, the first adhesive 70 undergo thermal expansion and generate a force which pushes the sensor retaining portion 80 toward the rear side (in the +Y-direction) relative to the image-forming optical system assembly 10. Meanwhile, the movement suppressing members 90 come into contact with the opposite surfaces 56a of the coupling portions 55 fixed to the image-forming optical system assembly 10. Therefore, due to thermal expansion under the elevation of temperature of the imaging apparatus 100, the movement suppressing members 90 generate a force which pushes the sensor retaining portion 80 toward the front side (in the −Y-direction) relatively. Accordingly, the movement suppressing members 90 apply the force having the inverse direction of the force which arises due to the thermal expansion of the first adhesives 70 and acts to push apart the sensor retaining portion 80 and the image-forming optical system assembly 10. Therefore, the displacement of the sensor retaining portion 80 moving apart from the image-forming optical system assembly 10 in the direction of the optical axis L is significantly reduced or prevented.

Moreover, in the imaging apparatus 100, the regions in which the first adhesives 70 come into contact with the second surface 82 of the sensor retaining portion 80 (second adhesive regions 72) are present on both sides of the optical axis L. Moreover, the regions in which the movement suppressing members 90 come into contact with the sensor retaining portion 80 (contact regions 91) are present on both sides of the optical axis L. Moreover, the regions in which the movement suppressing members 90 come into contact with the sensor retaining portion 80 (contact regions 91) are closer to the optical axis L than the regions in which the first adhesives 70 come into contact with the second surface 82 of the sensor retaining portion 80 (second adhesive regions 72). In other words, each pair of the first adhesives 70 and the movement suppressing members 90 are preferably disposed at two symmetric positions relative to the optical axis L as the center. Moreover, the projected contact regions 91P of the movement suppressing members 90 are positioned closer to the optical axis L than the second projected adhesive regions 72P of the first adhesives 70. Accordingly, the positions where the force is applied in the occasion when the movement suppressing members 90 undergo the thermal expansion are closer to the optical axis L in the sensor retaining portion 80 than the positions where the force is applied in the occasion when the first adhesives 70 undergo the thermal expansion. Therefore, the movement of the sensor retaining portion 80 in the direction of the optical axis L is significantly reduced or prevented.

Moreover, the metal movement suppressing members 90 are preferably included in the imaging apparatus 100. Therefore, the rigidity of the movement suppressing members 90 further suppress the movement of the sensor retaining portion 80 in the direction of the optical axis L caused by the thermal expansion of the first adhesives 70.

Moreover, the imaging apparatus 100 preferably includes the coupling portions 55. The coupling portions 55 are portions of the lens retaining member 12. Therefore, the imaging apparatus 100 can attain a simplified structure in which the number of components is reduced. In addition to this, in the above-mentioned structure, a screw fastening process in attaching the sensor retaining portion 80 to the lens retaining member 12 is not needed, which can simplify the manufacturing process.

The lens barrel 11 and the lens retaining member 12 define an image-forming optical system retaining body which retains the image-forming optical system 15. Therefore, the image-forming optical system assembly 10 of the imaging apparatus has a simplified shape.

In the imaging apparatus 100 according to the present preferred embodiment, the sensor retaining portion 80 may adopt a structure in which the fixing plate 40 is not included but a rigid board is used in place of the flexible printed circuit board 30. In this case, preferably, the first adhesives 70 and the movement suppressing members 90 come into direct contact with the two surfaces of the rigid board, respectively.

Moreover, in the imaging apparatus 100 according to the present preferred embodiment, the sensor retaining portion 80 has the structure in which the plate-shaped fixing plate 40 and the flexible printed circuit board 30 are layered. Nevertheless, the configuration of the sensor retaining portion 80 is not limited to such a configuration. Specifically, any member is sufficient as the sensor retaining portion 80 if it is furnished with the first surface 81 facing the rear side and the second surface 82 facing the front side so as to oppose the image-forming optical system assembly 10 and to retain the image sensor 20. For example, in the sensor retaining portion 80, a block-shaped fixing member may be adopted in place of the fixing plate 40.

Next, a first modification of the first preferred embodiment of the present invention is described.

Figure 6:
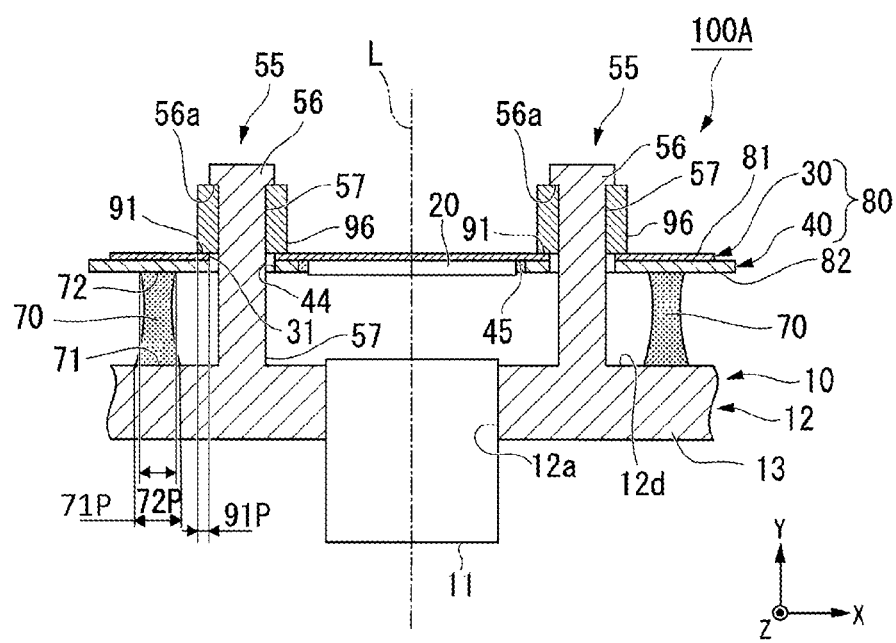
FIG. 6 is a schematic cross-sectional view, taken along the optical axis direction, of an imaging apparatus according to a first modification of the first preferred embodiment of the present invention.

FIG. 6 is a schematic cross-sectional view of an imaging apparatus 100A which preferably includes an image-forming optical system assembly 10A having the optical axis L, the image sensor 20, and the sensor retaining portion 80. The image-forming optical system assembly 10A includes a lens retaining member 12A retaining the lens barrel 11. In the first modification, movement suppressing members 60 are preferably resin components which are obtained beforehand through, for example, molding. Resin has a small modulus of longitudinal elasticity compared with metal and is easier to be deformed upon application of force. Nevertheless, it has a larger coefficient of thermal expansion than metal. Hence, when the first adhesives 70 are going to undergo the thermal expansion, the resin movement suppressing members 60 are also going to undergo the thermal expansion, which suppresses expansion of the first adhesives 70 in the direction of the optical axis L. Although the coefficients of thermal expansion of resins differ depending on kinds of the resins, they are generally closer to the coefficient of thermal expansion of adhesive after hardening than to the coefficient of thermal expansion of metal. Due to this, even when the force with which the relative position between the sensor retaining portion 80 and the image-forming optical system assembly 10 in the direction of the optical axis L changes is applied caused by the thermal expansion of the first adhesive 70, a force opposite to this force is generated by the thermal expansion of the movement suppressing members 60. Therefore, the movement of the sensor retaining portion 80 in the direction of the optical axis L is significantly reduced or prevented.

The movement suppressing members 96 can be produced by molding a thermo-plastic resin with injection molding and hardening it. In the modification, as its material, polycarbonate is used but it is not limited to this. Another resin material such as a polystyrene resin can be selected. Moreover, in this example, the volume of the resin movement suppressing members 96 is equal or substantially equal to the volume of the first adhesives 70. This is because the magnitudes of the forces generated in the thermal expansion are equal to each other. It should be noted that they are not necessary to be strictly equal to each other. As long as a ratio of the volume of the first adhesives 70 relative to the volume of the resin movement suppressing members 96 is about 0.5 or more and about 2 or less, for example, the difference between the forces generated in the thermal expansion is effectively made small.

Next, a second modification of the first preferred embodiment of the present invention is described.

Figure 7:
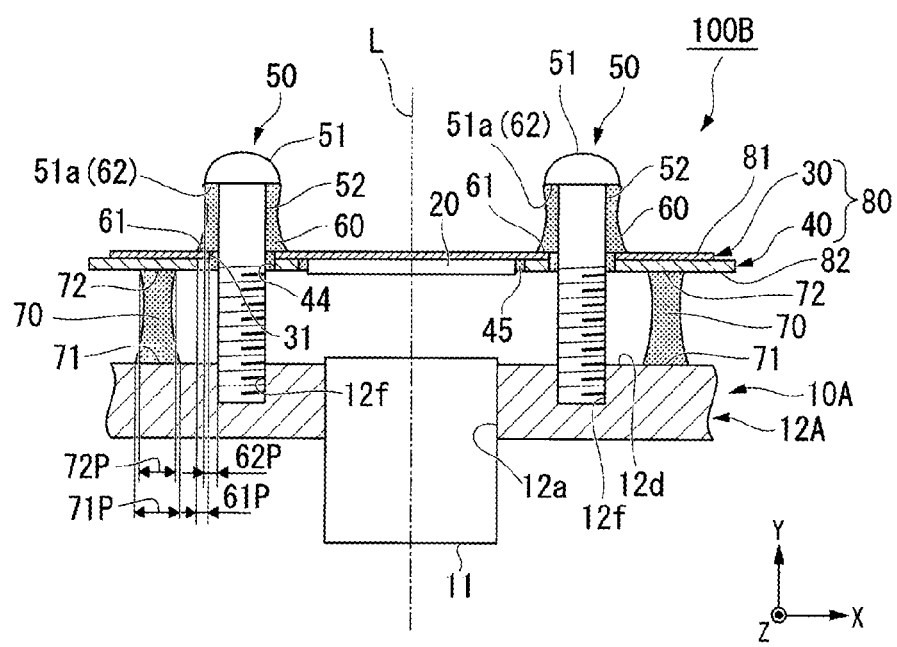
FIG. 7 is a schematic cross-sectional view, taken along the optical axis direction, of an imaging apparatus according to a second modification of the first preferred embodiment of the present invention.

FIG. 7 illustrates a schematic cross-sectional view of an imaging apparatus 100B which is a second modification of the first preferred embodiment of the present invention. In FIG. 7, in order to make the features of some characteristic portions more definite, the dimensions of some portions are emphasized for convenience by magnification especially in the Y-axis direction or the like. The ratios between the dimensions of the constituent elements are not always drawn to actual scale.

The imaging apparatus 100B in the second modification adopts second adhesives 60 which have been hardened as the movement suppressing members in place of the movement suppressing members as compared with the above-mentioned imaging apparatus 100. Similarly, the imaging apparatus 100B adopts head portion-equipped screws 50 as the coupling portions which are fixed to the lens retaining members 12A in place of the coupling portions 55.

Notably, the constituent elements with the same functions as those in the above-mentioned first preferred embodiment are given the same signs and their description is omitted.

The imaging apparatus 100B preferably includes an image-forming optical system assembly 10 including the optical axis L, the image sensor 20, the sensor retaining portion 80, the head portion-equipped screws 50 as the coupling portions fixed firmly adhered to the image-forming optical system assembly 10, the first adhesives 70 fixing the image-forming optical system assembly 10A and the sensor retaining portion 80 to each other, and the second adhesives 60 as the movement suppressing members firmly adhered to head portions 51 of the head portion-equipped screws 50.

The image-forming optical system assembly 10 includes a lens retaining member 12 retaining the lens barrel 11.

The lens retaining member 12 includes the rear side surface 12d on the rear side (that is, on the +Y-direction side). The rear side surface 12d is the surface of the lens retaining member 12 and faces the sensor retaining portion 80.

A pair of screw holes 12f are provided in the rear side surface 12d. The pair of head portion-equipped screws 50 are fitted into the screw holes 12f, respectively. The screw holes 12f preferably include threads 12b over an entirety of their inner circumferential surfaces in the length direction.

The head portion-equipped screws (coupling portions) 50 are fitted into the screw holes 12f, and thereby, fixed to the image-forming optical system assembly 10. The head portion-equipped screw 50 preferably includes a shaft portion 52 including threads, and the head portion 51 having an outer diameter larger than that of the shaft portion 52. The head portion-equipped screws (coupling portions) 50 are fixed to the image-forming optical system assembly 10.

The maximum width of the head portion 51 is preferably larger than the diameters of the through holes 44 and 31 of the sensor retaining portion 80. Since the head portion 51 according to the present preferred embodiment preferably is circular or substantially circular, the maximum width is equal to the outer diameter of the head portion 51. Moreover, in the imaging apparatus 100B, the head portions 51 are preferably positioned more on the rear side than the first surface 81 of the sensor retaining portion 80. Therefore, the fixing plate 40 and the flexible printed circuit board 30 are prevented from falling off.

The head portions 51 include opposite surfaces 51a. The opposite surfaces 51a are disposed on the front side (−Y-side) of the head portions 51, and oppose the first surface 81 which is the surface on the rear side of the sensor retaining portion 80. In the present preferred embodiment, the opposite surfaces 51a are the bearing surfaces of the head portion-equipped screws 50.

A predetermined interval is secured between the rear side surface 12d of the lens retaining member 12 and the second surface 82 of the sensor retaining portion 80 opposite to the rear side surface 12d. Therefore, the rear side surface 12d is set to be in the non-contacting state with the second surface 82. Preferably, this interval is partially filled with the first adhesives 70.

Moreover, an interval is secured between the first surface 81 of the sensor retaining portion 80 and the head portions 51. Therefore, the first surface 81 is set to be in a non-contacting state with the head portions 51. This interval is partially filled with the second adhesives 60.

The second adhesives 60 are disposed at least partially between the opposite surfaces 51a which are the surfaces on the front side of the head portions 51 of the head portion-equipped screws 50 and the first surface 81 which is the surface on the rear side of the sensor retaining portion 80. The pair of head portion-equipped screws 50 are disposed at the symmetric positions relative to the optical axis L as the center, respectively. Accordingly, the second adhesives 60 are also disposed at the two symmetric positions relative to the optical axis L as the center. The second adhesives 60 prevent the sensor retaining portion 80 from moving in the direction of the optical axis L relative to the image-forming optical system assembly 10A. Specifically, the second adhesives 60 after hardening are the movement suppressing members. As compared with the case where the beforehand molded resin members are used as the movement suppressing members, it is easier to assemble an imaging apparatus when the method is used in which the adhesives are disposed in the interval and hardened to be the movement suppressing members since the method allows the movement suppressing members to be formed to match the size of the interval. Therefore, assembly of the imaging apparatus is facilitated. For the second adhesives 60, for example, an adhesive of a kind which is hardened under irradiation with ultraviolet light can be used, and preferably, the adhesive of the same kind as that of the first adhesives 70 is used. Moreover, similarly to the case of the movement suppressing members 96 used in the first modification described above, the volume of the hardened second adhesives 60 is preferably equal or substantially equal to the volume of the first adhesives 70. It should be noted that they are not necessary to be strictly equal to each other. As long as a ratio of the volume of the first adhesives relative to the volume of the second adhesives is about 0.5 or more and about 2 or less, for example, the difference between the forces generated in the thermal expansion is effectively made small.

In the state where the first surface 81 of the sensor retaining portion 80 opposes the opposite surfaces 51a positioned at the head portions 51 of the head portion-equipped screws 50 at a predetermined interval, the second adhesives 60 are preferably disposed between the second surface 82 and the opposite surfaces 51a. The head portion-equipped screws 50 are attached into the screw holes 12f of the lens retaining member 12. Furthermore, the sensor retaining portion 80 is fixed to the lens retaining member 12 with the first adhesives 70. After that, the second adhesives 60 are disposed. In this state, at least portions of the head portion-equipped screws 50 pass through the through holes 31 of the flexible printed circuit board 30 and the through holes 44 of the fixing plate 40. Moreover, in this state, the first surface 81 of the sensor retaining portion 80 is disposed at the interval and is in the non-contacting state with the opposite surfaces 51a of the head portion-equipped screws 50. The second adhesives 60 are disposed between the first surface 81 of the sensor retaining portion 80 and the opposite surfaces 51a of the head portion-equipped screws 50.

A region in which the second adhesive 60 comes into contact with and adheres to the first surface 81 of the sensor retaining portion 80 is called a first contact region 61. Moreover, a region in which the second adhesive 60 comes into contact with (e.g., adheres to) the opposite surface 51*a* of the head portion-equipped screw 50 is called a second contact region 62 (shown in FIG. 6).

A first projected contact region 61P obtained by projecting the first contact region 61 in the direction of the optical axis L at least partially overlaps with a second projected contact region 62P obtained by projecting the second contact region 62 in the direction of the optical axis L. Notably, the first projected contact region 61P and the second projected contact region 62P are circular or substantially circular regions along the circumferential direction of the head portion-equipped screw 50. The shape of the portion in which the first projected contact region 61P overlaps with the second projected contact region 62P is also circular or substantially circular.

The first projected contact region 61P of the second adhesive 60 is disposed at a position closer to the optical axis L than the second projected adhesive region 72P of the first adhesive 70. The position to which the force aroused by the thermal expansion of the second adhesive 60 is applied is closer to the optical axis L than the position to which the force aroused by the thermal expansion of the first adhesive 70 in the sensor retaining portion 80 is applied.

Next, an assembly procedure of the imaging apparatus 100B having the above-mentioned configuration is described.

First, the image-forming optical system assembly 10, the image sensor 20, the sensor retaining portion 80 to which the image sensor 20 is fixed and which retains it, and two head portion-equipped screws 50 are prepared, each of these assembled in a previous procedure.

Next, the sensor retaining portion 80 to which the image sensor 20 is fixed is retained using a prearranged apparatus on the rear side (on the +Y-direction side) of the image-forming optical system assembly 10 in the non-contacting state with the image-forming optical system assembly 10 with a predetermined interval.

Next, in this state, the shaft portions 52 of the head portion-equipped screws 50 are placed to pass through the through holes 31 of the flexible printed circuit board 30 and the through holes 44 of the fixing plate 40 from the rear side to be fixed into the screw holes 12*f* of the lens retaining member 12.

Next, the first adhesives 70 are preferably disposed between the rear side surface 12*d* of the lens retaining member 12 and the second surface 82 of the sensor retaining portion 80.

Next, the second adhesives 60 are disposed between the first surface 81 of the sensor retaining portion 80 and the opposite surfaces 51*a* of the head portion-equipped screws 50. Notably, in this stage, the first adhesives 70 and the second adhesives 60 have not been hardened yet.

Next, using a predetermined apparatus (not shown), the position and the orientation of the image sensor 20 are adjusted relative to the optical axis L of the image-forming optical system assembly 10. In the adjustment of the position and the orientation of the image sensor 20, positioning in the direction of the optical axis L, positioning in the direction perpendicular or substantially perpendicular to the optical axis L, and adjustment of inclination relative to the optical axis L are performed.

Next, the first adhesives 70 and the second adhesives 60 are irradiated with ultraviolet light to be hardened.

Notably, the operation of disposing the adhesives and the operation of adjusting the position and the orientation may be performed in the reverse order or performed simultaneously.

The procedure as above completes the assembly of the imaging apparatus 100B.

The imaging apparatus 100B in the second modification achieves a similar effect to that of the imaging apparatus 100 according to the first preferred embodiment.

Moreover, in the imaging apparatus 100B, the adhesives (second adhesives 60) are preferably used as the movement suppressing members. By doing so, even when the thermal contraction of the adhesives occurs at the drop in the temperature of the imaging apparatus 100B, the movement of the sensor retaining portion 80 in the direction of the optical axis L is significantly reduced or prevented.

When the temperature of the imaging apparatus 100B drops, the first adhesives 70 undergo the thermal contraction and generate the force with which the sensor retaining portion 80 is pulled toward the front side (in the −Y-direction). Meanwhile, the second adhesives 60 generate, with the thermal contraction at the drop in the temperature of the imaging apparatus 100B, the force with which the sensor retaining portion 80 is pulled toward the rear side (in the +Y-direction). Accordingly, the second adhesives 60 apply, to the sensor retaining portion 80, the force opposite to the force, caused by the thermal contraction of the first adhesives 70, with which the sensor retaining portion 80 is pulled to come close to the image-forming optical system assembly 10A in the direction of the optical axis L. Therefore, the movement of the sensor retaining portion 80 and the image-forming optical system assembly 1A in the direction of the optical axis L is significantly reduced or prevented.

Moreover, the imaging apparatus 100B preferably uses the adhesives (second adhesives 60) as the movement suppressing members. As a result, the coefficient of thermal expansion of the movement suppressing members is close to the coefficient of thermal expansion of the first adhesives 70. As a result, positional displacement of the image sensor 20 is further reduced or prevented. In the present preferred embodiment, the first adhesives 70 and the second adhesives 60 are not necessary to be composed of the same kind of adhesive. Nevertheless, in view of making the coefficients of thermal expansion of the first adhesives 70 and the second adhesives 60 close to each other, preferably, the first adhesives 70 and the second adhesives 60 are composed of the same kind of adhesive.

Furthermore, preferably, the ratio of the volume of the second adhesives 60 relative to the volume of the first adhesives 70 preferably is about 0.5 or more and about 2 or less, for example. The volume ratio falls within this range, and thus, the difference between the force pressing the sensor retaining portion 80 due to the thermal expansion of the first adhesives 70 and the force pressing, in the reverse direction, the sensor retaining portion 80 due to the thermal expansion of the second adhesives 60 is made small. As a result, the positional displacement between the sensor retaining portion 80 and the image sensor 20 caused by the thermal expansion is significantly reduced or prevented to be small.

Moreover, in the imaging apparatus 100B, the first projected contact region 61P and the second projected contact region 62P which are obtained by projecting the first contact region 61 and the second contact region 62 of the second adhesive 60, respectively, in the direction of the optical axis L preferably at least partially overlap with each other. Therefore, the force reverse to the force, caused by the thermal expansion or the thermal contraction of the first adhesives 70, with which the sensor retaining portion 80 is pushed or pulled in the direction of the optical axis L (force due to the thermal expansion or the thermal contraction of the second adhesives 60) is readily transmitted in the direction of the optical axis L, which effectively apply this force to the effectively sensor retaining portion 80. Accordingly, the movement of the sensor retaining portion 80 in the direction of the optical axis L caused by the thermal expansion or the thermal contraction of the first adhesives 70 is further reduced or prevented.

Next, a third modification of the first preferred embodiment of the present invention is described.

Figure 8:
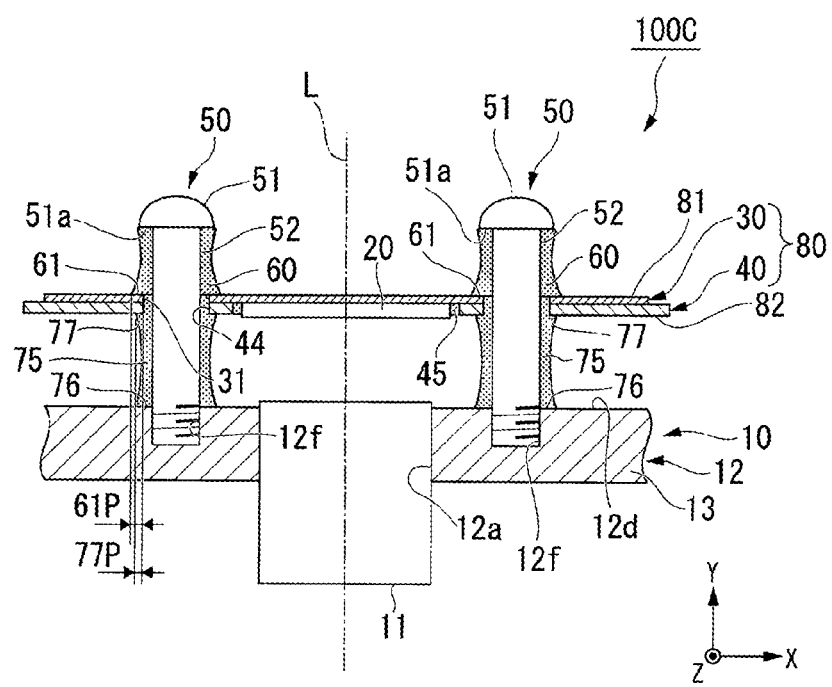
FIG. 8 is a schematic cross-sectional view, taken along the optical axis direction, of an imaging apparatus according to a third modification of the first preferred embodiment of the present invention.

FIG. 8 illustrates a schematic cross-sectional view of an imaging apparatus 100C which is the third modification of the first preferred embodiment of the present invention. In FIG. 8, in order to make the characteristic portions definite, the characteristic portions are emphasized for convenience by magnification especially in the Y-axis direction or the like. The ratios between the dimensions of the constituents are not always drawn to actual scale in this embodiment.

The imaging apparatus 100C in the third modification is different as compared with the above-mentioned imaging apparatus 100 mainly in that it adopts first adhesives 75 which are disposed at different positions from those of the first adhesives 70.

Notably, the constituent elements with the same functions as those in the above-mentioned first preferred embodiment are given the same signs and their description is omitted.

The imaging apparatus 100C preferably includes the image-forming optical system assembly 10 having the optical axis L, the image sensor 20, the sensor retaining portion 80, the head portion-equipped screws 50, the first adhesives 75, and the second adhesives 60.

The first adhesives 75 are disposed between the surface on the rear side of the image-forming optical system assembly 10 (rear side surface 12d of the lens retaining member 12) and the surface on the front side of the sensor retaining portion 80 (second surface 82), on the outer circumferences of the shaft portions 52 of the head portion-equipped screws 50. The pair of head portion-equipped screws 50 are disposed at the symmetric positions relative to the optical axis L as the center. Therefore, the first adhesives 75 are also disposed at two symmetric positions relative to the optical axis L as the center. The first adhesives 75 fix the image-forming optical system assembly 10 and the sensor retaining portion 80 to each other in the non-contacting state.

Similarly to the first preferred embodiment, the second adhesives 60 are preferably disposed between the opposite surfaces 51a which are the surfaces on the front side of the head portions 51 of the head portion-equipped screws 50 and the first surface 81 on the rear side of the sensor retaining portion 80.

Accordingly, the first adhesives 75 are positioned on the front side (−Y-side) and the second adhesives 60 are positioned on the rear side (+Y-side), thus interposing the through holes 31 and 44 of the sensor retaining portion 80 on the outer circumferences of the shaft portions 52 of the head portion-equipped screws 50.

A region in which the first adhesive 75 comes into contact with (e.g., adheres to) the second surface 82 of the sensor retaining portion 80 is called an adhesive region 77. Moreover, a region obtained by projecting the adhesive region 77 in the direction of the optical axis L is called a projected adhesive region 77P.

The first projected contact region 61P obtained by projecting the first contact region 61 which is the region in which the second adhesive 60 comes into contact with and adheres to the first surface 81 of the sensor retaining portion 80 in the direction of the optical axis L at least partially overlaps with the projected adhesive region 77P of the first adhesive 75. The region in which the second adhesive 60 comes into contact with the sensor retaining portion 80 (first contact region 61) at least partially overlaps with the region in which the first contact region 61 comes into contact with the second surface 82 (adhesive region 77) as seen in the direction of the optical axis L.

The imaging apparatus 100C in the third modification achieves a similar effect of the imaging apparatus 100 according to the first preferred embodiment. In addition to this, the first projected contact region 61P of the second adhesive 60 of the imaging apparatus 100C at least partially overlaps with the projected adhesive region 77P of the first adhesive 75. Specifically, the first adhesive 75 and the second adhesive 60 come into contact with (e.g., adheres to) the opposite portions of the sensor retaining portion 80 to each other. Therefore, even when the force, caused by the thermal expansion or the thermal contraction of the first adhesives 75, with which the sensor retaining portion 80 is pushed or pulled in the direction of the optical axis L is applied, the reverse force due to the thermal expansion or the thermal contraction of the second adhesives 60 is applied, which significantly reduces or prevents the movement.

Next, a fourth modification of the first preferred embodiment of the present invention is described.

In the fourth modification, a portion of the inner edge of the through hole 31 of the sensor retaining portion 80 preferably comes into contact with the side surface of the shaft portion 52 of the coupling portion 50. The other portions are preferably the same as those in the third modification. There is a case where, as a result of the positioning of the sensor retaining portion 80, a portion of the sensor retaining portion 80 comes in contact with the coupling portion in this way. In such a case, as long as the required characteristics are sufficiently satisfied even with not ideal positioning, the case is not accompanied by any intolerable problem for the products. Similarly, there is a case where, as a result of the positioning, the first surface 81 of the sensor retaining portion 80 comes into contact with the opposite surface 51a of the coupling portion 50 or the second surface 82 of the sensor retaining portion 80 comes into contact with the rear side surface 12d of the lens retaining member 12. Also in such a case, as long as the positioning is attained to an extent to which the required characteristics are sufficiently satisfied, the case is not accompanied by any intolerable problem. Similarly, there is a case where another portion of the sensor retaining portion 80 comes into contact with another portion of the lens retaining member 12 or the coupling portion 50. Also in such a case, as long as the positioning is attained, the case is not accompanied by any intolerable problem.

Next, a second preferred embodiment of the present invention is described.

Figure 9:
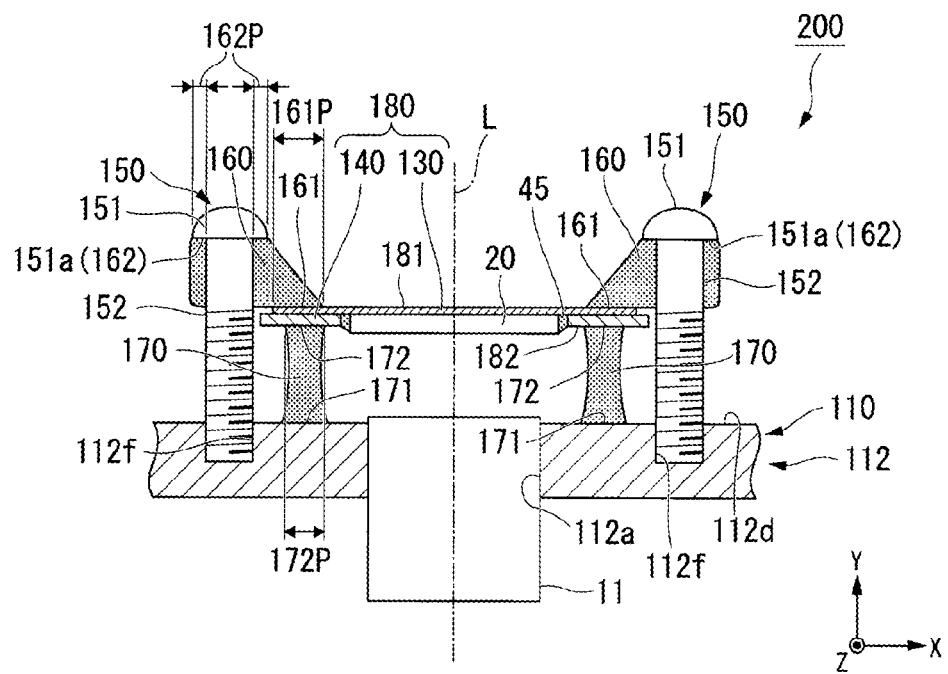
FIG. 9 is a schematic cross-sectional view, taken along the optical axis direction, of an imaging apparatus according to a second preferred embodiment of the present invention.

FIG. 9 illustrates a schematic cross-sectional view of an imaging apparatus 200 according to the second preferred embodiment. In FIG. 9, in order to make the characteristic portions definite, the dimensions of specific portions are emphasized for convenience by magnification especially in the Y-axis direction or the like. The ratios between the dimensions of the constituent elements are not always drawn to actual scale in this embodiment.

The imaging apparatus 200 according to the second preferred embodiment is different as compared with the imaging apparatus 100 according to the first preferred embodiment mainly in that it has a structure in which head portion-equipped screws 150 do not penetrate a sensor retaining portion 180.

Notably, the constituent elements with the same functions as those in the above-mentioned first preferred embodiment are given the same signs and their description is omitted.

The imaging apparatus 200 preferably includes an image-forming optical system assembly 110 including the optical axis L, the image sensor 20, the sensor retaining portion 180, the pair of head portion-equipped screws 150, first adhesives 170 and resin movement suppressing members 160. The movement suppressing members 160 preferably are prepared by, for example, injection molding of a thermo-plastic resin. In the present preferred embodiment, polycarbonate resin is preferably used as the material, which is not limited to this. Another resin such as polystyrene resin can be selected.

The image-forming optical system assembly 110 includes the image-forming optical system (omitted from the figure) having the optical axis L, the lens barrel 11 fixing the image-forming optical system, and a lens retaining member 112 retaining the lens barrel 11.

The lens retaining member 112 includes a fitting hole 112a with the optical axis L being the center axis. At least a portion of the lens barrel 11 is inserted and fixed into the fitting hole 112a.

The lens retaining member 112 of the image-forming optical system assembly 110 includes a rear side surface (optical system-side adhesive surface) 112d opposite to the sensor retaining portion 180 on the rear side (that is, the +Y-direction side). The rear side surface 112d spreads out at a position spaced apart from the optical axis L in a direction intersecting the direction in which the optical axis L extends. On the rear side surface 112d, first adhesive regions 171 to which the first adhesives 170 adhere are disposed. The first adhesives 170 fix the lens retaining member 112 and the sensor retaining portion 180 to each other.

At the center of the rear side surface 112d, an opening of the fitting hole 112a is disposed. Moreover, a pair of screw holes 112f are preferably disposed on the rear side surface 112d. The pair of head portion-equipped screws 150 are attached to the pair of screw holes 112f, respectively.

The sensor retaining portion 180 includes a flexible printed circuit board (circuit board) 130 in which the image sensor 20 is implemented, and a fixing plate 140. The fixing plate 140 retains the image sensor 20 via the adhesive 45 from the outer circumference side of the image sensor 20.

In the imaging apparatus 200, the image-forming optical system assembly 110 is preferably fixed to the sensor retaining portion 180 with the first adhesives 170 in a non-contacting state.

The sensor retaining portion 180 includes a first surface 181 positioned on the rear side of the fixing plate 140 (that is, on the +Y-side), and a second surface (sensor-side adhesive surface) 182 positioned on the front side of the flexible printed circuit board 130 (that is, on the −Y-side). The first surface 181 and the second surface 182 spread out at positions apart from the optical axis L in directions intersecting the direction in which the optical axis L extends. Second adhesive regions 172 to which the first adhesives 170 adhere are preferably provided on the second surface 182 of the sensor retaining portion 180. The first adhesives 170 fix the sensor retaining portion 180 and the image-forming optical system assembly 110 to each other.

The head portion-equipped screws (coupling portions) 150 are attached to the screw holes 112f and fixed to the image-forming optical system assembly 110. The head portion-equipped screw 150 includes a shaft portion 152 having an outer circumference surface on which threads are provided, and a head portion 151 including the outer diameter larger than the outer diameter of the shaft portion 152.

The pair of head portion-equipped screws 150 extend from the image-forming optical system assembly 110 on the rear side (in the +Y-direction), and are disposed on both sides of the sensor retaining portion 180 in the X-direction. In the imaging apparatus 200, the head portions 151 of the head portion-equipped screws 150 are preferably positioned more on the rear side than the first surface 181 of the sensor retaining portion 180. Moreover, opposite surfaces 151a are positioned on the front side (−Y-side) of the head portion 151. The opposite surfaces 151a oppose the first surface 181 which is the surface on the rear side of the sensor retaining portion 180.

A predetermined interval is secured between the first surface 181 of the sensor retaining portion 180 and the head portions 151. By doing so, the first surface 181 is set to be in the non-contacting state with the head portions 151. In this interval, the movement suppressing members 160 are disposed.

At least portions of the first adhesives 170 are disposed between the rear side surface 112d of the image-forming optical system assembly 110 and the second surface 182 of the sensor retaining portion 180. The first adhesives 170 are disposed at two symmetric positions relative to the optical axis L as the center.

At least portions of the movement suppressing members 160 are disposed between the opposite surfaces 151a which are the surfaces on the front side of the head portions 151 of the head portion-equipped screws 150 and the first surface 181 which are the surfaces on the rear side of the sensor retaining portion 180. The pair of head portion-equipped screws 150 are preferably disposed at the symmetric positions relative to the optical axis L as the center. Accordingly, the movement suppressing members 160 are also disposed at two symmetric positions relative to the optical axis L as the center.

A region in which the movement suppressing member 160 comes into contact with the first surface 181 of the sensor retaining portion 180 is called a first contact region 161. Moreover, a region in which the movement suppressing member 160 comes into contact with the opposite surface 151a of the head portion-equipped screw 150 is called a second contact region 162.

A first projected contact region 161P obtained by projecting the first contact region 161 in the direction of the optical axis L does not overlap with a second projected contact region 162P obtained by projecting the second contact region 162 in the direction of the optical axis L. The sensor retaining portion 180 is not disposed immediately below the opposite surfaces 151a of the head portion-equipped screws 150. Therefore, the movement suppressing members 160 are disposed to extend in the X-direction between the opposite surfaces 151a and the first surface 181.

Moreover, the first projected contact region 161P of the movement suppressing member 160 at least partially overlaps with a second projected adhesive region 172P obtained by projecting a second adhesive region 172 in which the first adhesive 170 comes into contact with and adhere to the second surface 182 of the sensor retaining portion 180 in the direction of the optical axis L. Therefore, the first adhesive 170 and the movement suppressing member 160 are disposed opposite to each other in the direction of the optical axis, interposing the sensor retaining portion 180. According to this arrangement, the movement of the sensor retaining portion 180 caused by the thermal expansion of the first adhesives 170 is effectively reduced or prevented by the pressure generated by the thermal expansion of the movement suppressing members 160.

In the imaging apparatus 200 according to the present preferred embodiment, the head portion-equipped screws 150 do not penetrate the sensor retaining portion 180 but are disposed on both sides thereof to be adjacent to the sensor retaining portion 180 in the X-direction. Therefore, when the position adjustment of the image sensor 20 relative to the optical axis L of the image-forming optical system assembly 110 is performed, the sensor retaining portion 180 is arbitrarily moved with no limitation. Accordingly, the positioning of the sensor retaining portion 180 is arbitrarily performed and the image sensor 20 is positioned at the most suitable position.

Next, a third preferred embodiment of the present invention is described.

Figure 10:
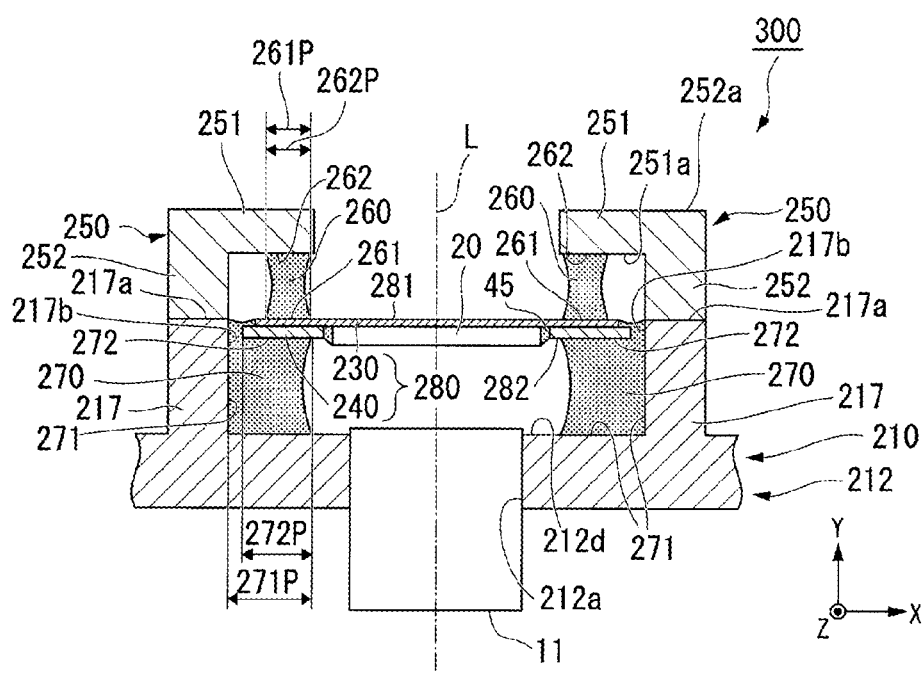
FIG. 10 is a schematic cross-sectional view, taken along the optical axis direction, of an imaging apparatus according to a third preferred embodiment of the present invention.

FIG. 10 illustrates a schematic cross-sectional view of an imaging apparatus 300 according to the third preferred embodiment. In FIG. 10, in order to make the characteristic portions definite, the dimensions of characteristic portions are emphasized for convenience by magnification especially in the Y-axis direction or the like. The ratios between the dimensions of the constituent elements are not always drawn to actual scale in this embodiment.

The imaging apparatus 300 according to the third preferred embodiment is different as compared with the imaging apparatus 100 according to the first preferred embodiment mainly in that side wall portions (side walls) 252 including extending portions 251 are adopted as coupling portions 250 in place of the head portion-equipped screws 50.

Notably, the constituent elements with the same functions as those in the above-mentioned first preferred embodiment are given the same signs and their description is omitted.

The imaging apparatus 300 preferably includes an image-forming optical system assembly 210 including the optical axis L, the image sensor 20, a sensor retaining portion 280, the pair of coupling portions 250, first adhesives 270 and second adhesives 260.

The image-forming optical system assembly 210 preferably includes an image-forming optical system (omitted in the figure) including the optical axis L, the lens barrel 11 fixing the image-forming optical system, and a lens retaining member 212 retaining the lens barrel 11.

The lens retaining member 212 includes a fitting hole 212a with the optical axis L being the center axis. The lens barrel 11 is inserted into and fixed into the fitting hole 212a.

The lens retaining member 212 of the image-forming optical system assembly 210 preferably includes a rear side surface (optical system-side adhesive surface) 212d opposite to the sensor retaining portion 280 on the rear side (that is, the +Y-direction side). The rear side surface 212d spreads out at a position spaced apart from the optical axis L in a direction intersecting the direction in which the optical axis L extends.

The rear side surface 212d includes a pair of side walls 217 protruding from the surface of the rear side surface 212d on the rear side (in the +Y-direction). The side walls 217 are respectively disposed at symmetric positions, the optical axis L interposed therebetween. Rear side end surfaces 217a to which the coupling portions 250 are fixed are disposed at the tips of the side walls 217 on the rear side (in the +Y-direction).

First adhesive regions 271 to which the first adhesives 270 adhere are preferably disposed in inner wall surfaces 217b, of the side walls 217, facing the optical axis L side and the rear side surface 212d. The first adhesives 270 fix the lens retaining member 212 and the sensor retaining portion 280 to each other.

The sensor retaining portion 280 includes a flexible printed circuit board (circuit board) 230 on which the image sensor is secured, and a fixing plate 240. The fixing plate 240 retains the image sensor 20 via the adhesive 45 from the outer circumference side of the image sensor 20.

In the imaging apparatus 300, the image-forming optical system assembly 210 is fixed to the sensor retaining portion 280 with the first adhesives 270 in the non-contacting state.

The sensor retaining portion 280 preferably includes a first surface 281 and a second surface (sensor-side adhesive surface) 282. The first surface 281 and the second surface 282 spread out at positions apart from the optical axis L in directions intersecting the direction in which the optical axis L extends. The first surface 281 is positioned on the rear side (that is, +Y-side) of the fixing plate 240. The second surface 282 is positioned on the front side (that is, −Y-side) of the flexible printed circuit board 230. Second adhesive regions 272 to which the first adhesives 270 adhere are disposed on the second surface 282 of the sensor retaining portion 280. The first adhesives 270 fix the sensor retaining portion 280 and the image-forming optical system assembly 210 to each other.

The pair of coupling portions 250 are preferably fixed to the rear side end surfaces 217a of the pair of side walls 217, respectively, for example, with screws.

The coupling portion 250 preferably includes the side wall portion (side wall) 252 and the extending portion 251. The side wall portion (side wall) 252 further extends from the rear side end surface 217a of the side wall 217 on the rear side (in the +Y-direction). The extending portion 251 extends from a tip 252a of the side wall portion 252 in the direction of the optical axis L. An opposite surface 251a is positioned on the front side (−Y-side) of the extending portion 251. The opposite surface 251a opposes the first surface 281 which is the surface on the rear side of the sensor retaining portion 280.

At least portions of the first adhesives 270 are disposed between the rear side surface 212d and the inner wall surfaces 217b of the image-forming optical system assembly 210 and the second surface 282 of the sensor retaining portion 280.

The first adhesives 270 are preferably disposed not only on the rear side surface 212d of the image-forming optical system assembly 210 but also on the inner wall surfaces 217b. Therefore, the adhesive area in which the first adhesives 270 are disposed is secured to be wide. As a result, the adhesive strength for the members is increased and they are hardly peeled off. Adhesives generally tend to be peeled off due to impact in the direction of shearing. The first adhesives 270 are disposed on the rear side surface 212d and the inner wall surfaces 217b which spread out in the different directions, and thereby, are hardly peeled off due to impact in various directions.

A region in which the first adhesive 270 comes into contact with (e.g., adheres to) the rear side surface 212d of the lens retaining member 212 and the inner wall surface 217b of the side wall 217 is called the first adhesive region 271. Moreover, a region in which the first adhesive 270 comes into contact with (e.g., adheres to) the second surface 282 of the sensor retaining portion 280 is called the second adhesive region 272

A first projected adhesive region 271P obtained by projecting the first adhesive region 271 in the direction of the optical axis L is included in a second projected adhesive region 272P obtained by projecting the second adhesive region 272 in the direction of the optical axis L.

At least portions of the second adhesives 260 are disposed between the opposite surfaces 251a which are positioned on the extending portions 251 of the coupling portions 250 and are the surfaces on the front side and the first surface 281 which is the surface on the rear side of the sensor retaining portion 280. The second adhesives 260 are also preferably disposed at two symmetric positions relative to the optical axis L as the center. The second adhesives 260 prevent the sensor retaining portion 280 from moving in the direction of the optical axis L relative to the image-forming optical system assembly 210. The second adhesives 260 are the movement suppressing members.

A region in which the second adhesive 260 comes into contact with and adheres to the first surface 281 of the sensor retaining portion 280 is called a first contact region 261. Moreover, a region in which the second adhesive 260 comes into contact with and adheres to the opposite surface 251a of the coupling portion 250 is called a second contact region 262.

A first projected contact region 261P obtained by projecting the first contact region 261 in the direction of the optical axis L at least partially overlaps with a second projected contact region 262P obtained by projecting the second contact region 262 in the direction of the optical axis L.

Moreover, the first projected contact region 261P of the second adhesive 260 preferably at least partially overlaps with the second projected adhesive region 272P of the first adhesive 270. Therefore, the first adhesives 270 and the second adhesives 260 are disposed on the opposite sides in the Y-direction, interposing the sensor retaining portion 280. The movement of the sensor retaining portion 280 caused by the thermal expansion or the thermal contraction of the first adhesives 270 is effectively reduced or prevented by the pressure generated due to the thermal expansion or the thermal contraction of the second adhesives 260.

Next, an assembly procedure of the imaging apparatus 300 having the above-mentioned configuration is described.

First, the image-forming optical system assembly 210, the image sensor 20, the sensor retaining portion 280 fixing and retaining it, and two coupling portions 250 are prepared, each of these components is assembled in a previous procedure.

Next, the sensor retaining portion 280 to which the image sensor 20 is fixed is aerially retained using a predetermined apparatus on the rear side (+Y-direction side) of the image-forming optical system assembly 210 in the non-contacting state with a predetermined interval.

Next, the first adhesives 270 are disposed between the rear side surface 212d of the lens retaining member 212 and the second surface 282 of the sensor retaining portion 280.

Next, using a predetermined apparatus (not shown) to adjust the optical axis, the position adjustment of the image sensor 20 is performed relative to the optical axis L of the image-forming optical system assembly 210

Next, the first adhesives 270 are preferably irradiated with ultraviolet light to be hardened.

Next, the coupling portions 250 are fixed to the rear side end surfaces 217a of the side walls 217.

Next, the second adhesives 260 are disposed and hardened between the first surface 281 of the sensor retaining portion 280 and the opposite surfaces 251a of the coupling portions 250.

The procedure as above completes the assembly of the imaging apparatus 300.

Notably, the coupling portions 250 and the lens retaining member 212 may be provided by a single monolithic member, for example. In this case, in the assembly procedure, the sensor retaining portion 280 is slid to be inserted between the opposite surfaces 251a of the coupling portions 250 and the rear side surface 212d of the image-forming optical system assembly 210. Furthermore, in this state, the sensor retaining portion 280 is aerially retained to perform the position adjustment of the image sensor 20 relative to the optical axis L of the image-forming optical system assembly 210. The first adhesives 270 and the second adhesives 260 are further disposed to be hardened.

In the imaging apparatus 300 according to the present preferred embodiment, the coupling portions 250 include the pair of side wall portions 252 extending on the rear side to interpose the sensor retaining portion 280. Moreover, the tips 252a of the pair of side wall portions 252 reach the rear side more than at least a portion of the surface facing the rear side of the sensor retaining portion 280 (first surface 281). Moreover, the coupling portions 250 include the extending portions 251 extending from the tips 252a of the side wall portions 252 toward the optical axis L. Moreover, the opposite surfaces 251a are preferably positioned on the surfaces of the extending portions 251. The imaging apparatus 300 can attain the similar effect of the imaging apparatuses 100 and 200 according to the first preferred embodiment and the second preferred embodiment.

In addition to this, there is a portion in which all of the first projected adhesive region 271P and the second projected adhesive region 272P of the first adhesive 270 and the first projected contact region 261P and the second projected contact region 262P of the second adhesive 260 overlap with one another. Accordingly, the pressure due to the thermal expansion or the thermal contraction of the first adhesives 270 and the pressure due to the thermal expansion or the thermal contraction of the second adhesives 260 are applied to the overlapping portion of the sensor retaining portion 280 from both sides thereof in the direction of the optical axis L. Therefore, the movement of the sensor retaining portion 280 in the direction of the optical axis L is further effectively suppressed.

A first Modification of the third preferred embodiment of the present invention is described.

Figure 11:
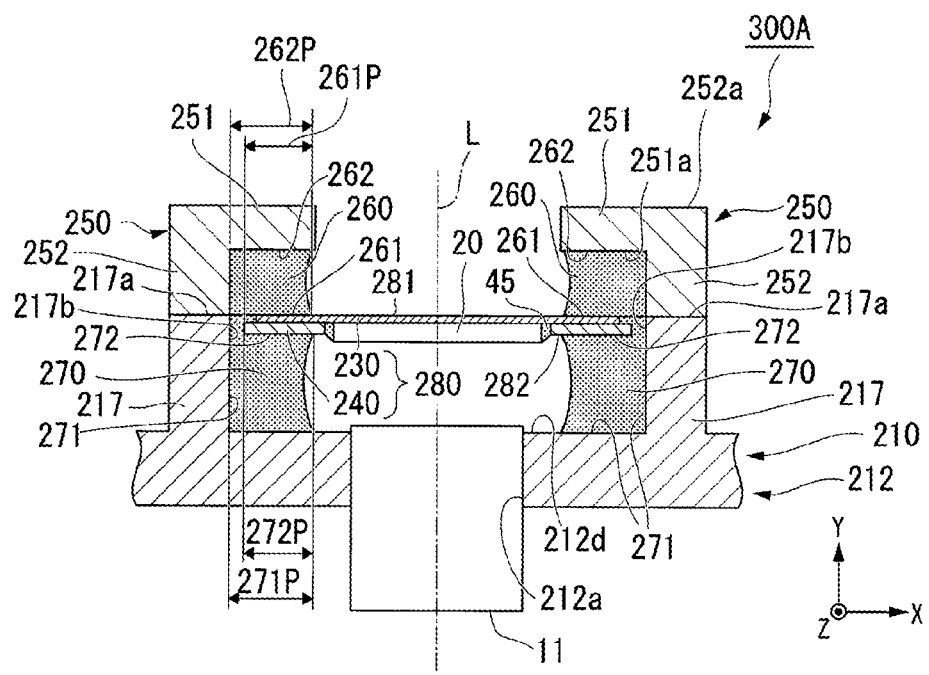
FIG. 11 is a schematic cross-sectional view, taken along the optical axis direction, of an imaging apparatus according to a first modification of the third preferred embodiment of the present invention.

FIG. 11 illustrates a schematic cross-sectional view of an imaging apparatus 300A which is a first modification of the third preferred embodiment. In the modification, compared with the imaging apparatus 300 according to the third preferred embodiment, the second adhesives 260 come into contact with (e.g., adhere to) not only the first surface 28 of the sensor retaining portion 280 and the opposite surfaces 251a of the coupling portions 250 but also the inner wall surfaces 217b.

In the modification, the adhesive area in which the second adhesives 260 are disposed is secured to be wide. As a result, the adhesive strength for the members is increased and they are difficult to peel off. Moreover, adhesives generally tend to be peeled off due to impact in the direction of shearing. However, the second adhesives 260 are disposed on the opposite surfaces 251a and the inner wall surfaces 217b which spread out in the different directions, and thereby, are difficult to peel off due to impact in various directions.

In addition to this, the portion in which all of the first projected adhesive region 271P and the second projected adhesive region 272P of the first adhesive 270 and the first projected contact region 261P and the second projected contact region 262P of the second adhesive 260 overlap with one another is increased. Accordingly, the movement of the sensor retaining portion 280 in the direction of the optical axis L is further effectively reduced or prevented.

Next, a second modification of the third preferred embodiment of the present invention is described.

In the second modification, as a result of the positioning of the sensor retaining portion 280, the second surface 282 of the sensor retaining portion 280 comes into contact with the rear side surface 212d of the lens retaining member 212. The other parts are preferably the same as those in the first modification. There is a case where a portion of the sensor retaining portion 280 results in contact with the lens retaining member 212 in this way. In such a case, as long as the required characteristics are sufficiently satisfied, the case does not cause any intolerable problem for the products. Similarly, there is a case where another portion of the sensor retaining portion 280 comes into contact with another portion of the coupling portion 250 or the lens retaining member 212. Also in such a case, as long as the positioning is attained, the case does not cause any intolerable problem.

As described above, the various preferred embodiments according to the present invention and modifications thereof are described. The configurations in the preferred embodiments and combinations of these are merely examples. Additions, omissions, substitutions and any other modifications may occur without departing from the scope and spirit of the present invention. Moreover, the present invention is not intended to be limited to the preferred embodiments and modifications thereof.

Notably, in the above description, when the language such as rectangular or circular is used for the shapes of the members and portions, it does not strictly limit these to being rectangular or circular. For example, even if the corner portions of the shape are rounded, it falls within the range of the rectangular shape referred to in the above description as long as it is still substantially rectangular as a whole.

While preferred embodiments of the present invention and modifications thereof have been described above, it is to be understood that variations and additional modifications will be apparent to those skilled in the art without departing from the scope and spirit of the present invention. The scope of the present invention, therefore, is to be determined solely by the following claims.

What is claimed is:

1. An imaging apparatus comprising:
an image-forming optical system assembly;
an image sensor that is disposed on a rear side which is a side on which rays incident on the image-forming optical system assembly form an image relative to the image-forming optical system assembly, and that an image generated by the image-forming optical system assembly is projected on;
a sensor retaining portion that is configured to retain the image sensor;
a coupling portion that is fixed to the image-forming optical system assembly; and
a movement suppressing member that is immovable with respect to the coupling portion; wherein
the image-forming optical system assembly includes an optical system-side adhesive surface that spreads out at a position spaced apart from an optical axis in a direction intersecting a direction in which the optical axis extends;
the coupling portion includes an opposite surface that spreads out at a position spaced apart from the optical axis in a direction intersecting the direction in which the optical axis extends;
the sensor retaining portion includes a sensor-side adhesive surface that spreads out at a position spaced apart from the optical axis in a direction intersecting the direction in which the optical axis extends;
the optical system-side adhesive surface faces the rear side;
the sensor-side adhesive surface faces a front side reverse to the rear side;
the opposite surface faces the front side in an optical axis direction;
a first adhesive that at least a portion of a gap between the optical system-side adhesive surface and the sensor-side adhesive surface is filled with, and that comes into close contact with both of the optical system-side adhesive surface and the sensor-side adhesive surface, is included; and
the movement suppressing member comes into contact with the opposite surface, and comes into contact with the sensor retaining portion on a surface facing the rear side out of surfaces of the sensor retaining portion.

2. The imaging apparatus according to claim 1, wherein a surface of the sensor retaining portion is in a non-contacting state with a surface of the image-forming optical system assembly.

3. The imaging apparatus according to claim 1, wherein a region in which the movement suppressing member comes into contact with the sensor retaining portion at least partially overlaps with a region in which the first adhesive comes into contact with the sensor-side adhesive surface as seen in the optical axis direction.

4. The imaging apparatus according to claim 2, wherein a region in which the movement suppressing member comes into contact with the sensor retaining portion at least partially overlaps with a region in which the first adhesive comes into contact with the sensor-side adhesive surface as seen in the optical axis direction.

5. The imaging apparatus according to claim 1, wherein
regions in which the first adhesive comes into contact with the sensor-side adhesive surface are present on both sides of the optical axis;
regions in which the movement suppressing member comes into contact with the sensor retaining portion are present on both sides of the optical axis; and
the region in which the movement suppressing member comes into contact with the sensor retaining portion is closer to the optical axis than the region in which the first adhesive comes into contact with the sensor-side adhesive surface.

6. The imaging apparatus according to claim 2, wherein
regions in which the first adhesive comes into contact with the sensor-side adhesive surface are present on both sides of the optical axis;
regions in which the movement suppressing member comes into contact with the sensor retaining portion are present on both sides of the optical axis; and
the region in which the movement suppressing member comes into contact with the sensor retaining portion is closer to the optical axis than the region in which the first adhesive comes into contact with the sensor-side adhesive surface.

7. The imaging apparatus according to claim 3, wherein
regions in which the first adhesive comes into contact with the sensor-side adhesive surface are present on both sides of the optical axis;
regions in which the movement suppressing member comes into contact with the sensor retaining portion are present on both sides of the optical axis; and
the region in which the movement suppressing member comes into contact with the sensor retaining portion is closer to the optical axis than the region in which the first adhesive comes into contact with the sensor-side adhesive surface.

8. The imaging apparatus according to claim 1, wherein
the sensor retaining portion includes a through hole penetrating therethrough in the optical axis direction;
the coupling portion includes a shaft portion whose diameter is smaller than an inner diameter of the through hole and a head portion larger in maximum width than the through hole;
the shaft portion is inserted through the through hole;
the head portion is positioned more on the rear side than the through hole; and
the opposite surface is positioned at the head portion.

9. The imaging apparatus according to claim 2, wherein
the sensor retaining portion includes a through hole penetrating therethrough in the optical axis direction;
the coupling portion includes a shaft portion whose diameter is smaller than an inner diameter of the through hole and a head portion larger in maximum width than the through hole;
the shaft portion is inserted through the through hole;
the head portion is positioned more on the rear side than the through hole; and
the opposite surface is positioned at the head portion.

10. The imaging apparatus according to claim 1, wherein
the coupling portion or the image-forming optical system assembly includes a pair of side walls that interpose the sensor retaining portion therebetween and extend on the rear side;
tips of the pair of side walls reach the rear side more than at least a portion of the surface, of the sensor retaining portion, facing the rear side;
the coupling portion includes an extending portion extending from the tip of the side wall toward the optical axis; and
the opposite surface is positioned on a surface of the extending portion.

11. The imaging apparatus according to claim 2, wherein
the coupling portion or the image-forming optical system assembly includes a pair of side walls that interpose the sensor retaining portion therebetween and extend on the rear side;
tips of the pair of side walls reach the rear side more than at least a portion of the surface, of the sensor retaining portion, facing the rear side;
the coupling portion includes an extending portion that extends from the tip of the side wall toward the optical axis; and
the opposite surface is positioned on a surface of the extending portion.

12. The imaging apparatus according to claim 1, wherein
the sensor retaining portion includes a circuit board; and
the movement suppressing member comes into contact with the sensor retaining portion on a surface of the circuit board.

13. The imaging apparatus according to claim 2, wherein
the sensor retaining portion includes a circuit board; and
the movement suppressing member comes into contact with the sensor retaining portion on a surface of the circuit board.

14. The imaging apparatus according to claim 8, wherein
the sensor retaining portion includes a circuit board; and
the movement suppressing member comes into contact with the sensor retaining portion on a surface of the circuit board.

15. The imaging apparatus according to claim 9, wherein
the sensor retaining portion includes a circuit board; and
the movement suppressing member comes into contact with the sensor retaining portion on a surface of the circuit board.

16. The imaging apparatus according to claim 10, wherein
the sensor retaining portion includes a circuit board; and
the movement suppressing member comes into contact with the sensor retaining portion on a surface of the circuit board.

17. The imaging apparatus according to claim 11, wherein
the sensor retaining portion includes a circuit board; and
the movement suppressing member comes into contact with the sensor retaining portion on a surface of the circuit board.

18. The imaging apparatus according to claim 1, wherein
the image-forming optical system assembly includes an image-forming optical system and an image-forming optical system retaining member that retains the image-forming optical system; and
the optical system-side adhesive surface is positioned on a surface of the image-forming optical system retaining member.

19. The imaging apparatus according to claim 2, wherein
the image-forming optical system assembly includes an image-forming optical system and an image-forming optical system retaining member that retains the image-forming optical system; and
the optical system-side adhesive surface is positioned on a surface of the image-forming optical system retaining member.

20. The imaging apparatus according to claim 11, wherein
the image-forming optical system assembly includes an image-forming optical system and an image-forming optical system retaining member that retains the image-forming optical system; and
the optical system-side adhesive surface is positioned on a surface of the image-forming optical system retaining member.

21. The imaging apparatus according to claim 17, wherein
the image-forming optical system assembly includes an image-forming optical system and an image-forming optical system retaining member that retains the image-forming optical system; and
the optical system-side adhesive surface is positioned on a surface of the image-forming optical system retaining member.

22. The imaging apparatus according to claim 1, wherein
the image-forming optical system assembly includes an image-forming optical system and an image-forming optical system retaining member that retains the image-forming optical system;
the optical system-side adhesive surface is positioned on a surface of the image-forming optical system retaining member; and
the coupling portion is a portion of the image-forming optical system retaining member.

23. The imaging apparatus according to claim 1, wherein the movement suppressing member is a metal member.

24. The imaging apparatus according to claim 1, wherein the movement suppressing member is a resin member.

25. The imaging apparatus according to claim 2, wherein the movement suppressing member is a resin member.

26. The imaging apparatus according to claim 11, wherein the movement suppressing member is a resin member.

27. The imaging apparatus according to claim 17, wherein the movement suppressing member is a resin member.

28. The imaging apparatus according to claim 21, wherein the movement suppressing member is a resin member.

29. The imaging apparatus according to claim 24, wherein a ratio of a volume of the first adhesive relative to a volume of the resin member is about 0.5 or more and about 2 or less.

30. The imaging apparatus according to claim 25, wherein a ratio of a volume of the first adhesive relative to a volume of the resin member is about 0.5 or more and about 2 or less.

31. The imaging apparatus according to claim 26, wherein a ratio of a volume of the first adhesive relative to a volume of the resin member is about 0.5 or more and about 2 or less.

32. The imaging apparatus according to claim 27, wherein a ratio of a volume of the first adhesive relative to a volume of the resin member is about 0.5 or more and about 2 or less.

33. The imaging apparatus according to claim 28, wherein a ratio of a volume of the first adhesive relative to a volume of the resin member is about 0.5 or more and about 2 or less.

* * * * *